(12) United States Patent
Schwarzwald-Schlemmer et al.

(10) Patent No.: US 12,602,145 B1
(45) Date of Patent: Apr. 14, 2026

(54) MOUSE AND KEYBOARD FUNCTIONALITY FOR EFFICIENT EXTRACTION OF CONTENT

(71) Applicant: K. Melsh Innovative Software, Inc., Sechelt (CA)

(72) Inventors: Maximilian Hubert Schwarzwald-Schlemmer, Regensburg (DE); Hubert Christian Truckenbrodt, Sechelt (CA)

(73) Assignee: K. Melsh Innovative Software, Inc., Sechelt (CA)

( * ) Notice: Subject to any disclaimer, the term of this patent is extended or adjusted under 35 U.S.C. 154(b) by 201 days.

(21) Appl. No.: 18/438,415

(22) Filed: Feb. 10, 2024

Related U.S. Application Data

(60) Provisional application No. 63/445,423, filed on Feb. 14, 2023.

(51) Int. Cl.
*G06F 3/04842* (2022.01)
*G06F 40/166* (2020.01)

(52) U.S. Cl.
CPC ........ *G06F 3/04842* (2013.01); *G06F 40/166* (2020.01)

(58) Field of Classification Search
CPC .................................................. G06F 3/04842
USPC ......................................................... 715/771
See application file for complete search history.

(56) References Cited

U.S. PATENT DOCUMENTS 5,630,080 A * 5/1997 Malamud .............. G06F 40/166
715/975

| | | | | |
|---|---|---|---|---|
| 8,471,824 B2 * | 6/2013 | Kim | .................... | G06F 15/0291 |
| | | | | 345/173 |
| 8,490,019 B2 * | 7/2013 | Jarrett | ................. | G06F 3/04817 |
| | | | | 715/838 |
| 9,235,558 B2 * | 1/2016 | Abe | ....................... | G06F 40/134 |
| 9,460,315 B2 * | 10/2016 | Teranishi | .................. | H04L 9/30 |
| 9,514,102 B2 * | 12/2016 | Sriver | ................... | G06F 40/114 |
| 9,569,729 B1 * | 2/2017 | Oehrle | ................. | G06Q 10/063 |

(Continued)

OTHER PUBLICATIONS

Karina Adcock, Screenshot of "How to make comments in Adobe Acrobat Reader" video, available online at <https://www.youtube.com/watch?v=6F3u8Rn0dqY>, 2 pages, published on Jun. 30, 2020 (Year: 2020).*

(Continued)

*Primary Examiner* — Reza Nabi
(74) *Attorney, Agent, or Firm* — Smartpat PLC

(57) ABSTRACT

Excerpting on the computer currently involves extracting important text passages from a source document to an excerpt document using Copy and Paste. A computer-implemented method and two computer-implemented applications are described that make excerpting on the computer more efficient for the user. They recognize the release of a button pressed while selecting a portion of a source document, such as the release of the left mouse button at the end of making a selection with the mouse. Upon the release of the button, the selected portion is copied and pasted into an excerpt document without further user input. Definitions of insertion positions are described that allow the CPU to conduct such copying and pasting without user input. It is shown how the definitions provide the user with useful options and results. Some extensions lead to further efficiency of excerpting on the computer for the user.

18 Claims, 20 Drawing Sheets

(56) References Cited

U.S. PATENT DOCUMENTS

| | | | | |
|---|---|---|---|---|
| 2005/0086309 A1* | 4/2005 | Galli | .................... | G06Q 10/107 709/206 |
| 2005/0210396 A1* | 9/2005 | Galli | ........................ | G06F 8/00 715/758 |
| 2007/0022386 A1* | 1/2007 | Boss | ....................... | G06F 9/543 715/764 |
| 2008/0143975 A1* | 6/2008 | Dennard | ................ | G03B 21/26 353/42 |
| 2010/0325536 A1* | 12/2010 | Kong | ...................... | G06F 16/93 715/255 |
| 2012/0299956 A1* | 11/2012 | Waltman | ................. | G06T 11/60 345/629 |
| 2013/0141370 A1* | 6/2013 | Wang | ...................... | G06F 3/041 345/173 |
| 2014/0068754 A1* | 3/2014 | Burkill | .................... | G06F 21/36 726/18 |
| 2015/0106723 A1* | 4/2015 | Bertelsen | ........... | G06F 3/04842 715/738 |
| 2018/0189691 A1* | 7/2018 | Oehrle | ..................... | G06N 7/01 |
| 2018/0359208 A1* | 12/2018 | Aistrope | .............. | G06F 16/334 |
| 2019/0129517 A1* | 5/2019 | Wisnia | .................. | G06F 3/0231 |
| 2019/0251140 A1* | 8/2019 | Tashman | ............. | G06F 3/04883 |
| 2020/0014640 A1* | 1/2020 | DeLuca | ................ | H04L 51/046 |
| 2021/0286852 A1* | 9/2021 | Smith | .................. | G06F 16/954 |
| 2023/0418466 A1* | 12/2023 | Proulx | .................. | G06F 3/0489 |
| 2024/0386122 A1* | 11/2024 | Taillefer | .............. | G06F 21/6218 |
| 2025/0086804 A1* | 3/2025 | Hu | ....................... | G06F 3/04883 |

OTHER PUBLICATIONS

Erin Wright, Screenshot of "How to Use the Comment and Markup Tools in Adobe Acrobat" video, available online at <https://youtu.be/idvanvVK1Ys>, 6 pages, published on Feb. 15, 2021 (Year: 2021).*

Earl C. Ruby III, "Mouse button Copy & Paste on Ubuntu 20.04," available online at <https://earlruby.org/2021/01/mouse-button-copy-paste-on-ubuntu-20-04/comment-page-1/>, 6 pages published on Jan. 2, 2024. (Year: 2024).*

Earl C. Ruby III, "Mouse button Copy & Paste on Ubuntu 20.04," Posted on Jan. 2, 2021 at https://earlruby.org/2021/01/mouse-button-copy-paste-on-ubuntu-20-04/comment-page-1/.

Evernote Help and Learning, "Clip format," obtained from https://help.evernote.com/hc/en-US/articles/209125827-Clip-formats on Apr. 29, 2024.

L Holmgren, Youtube video "Annotating with Kindle Apps," Aug. 11, 2013, retrieved from https://www.youtube.com/watch?v=kxpDksBASZ8.

Unknown author, "Auto Copy" Chrome Extension, retrieved from https://chromewebstore.google.com/detail/auto-copy/bijpdibkloghppkbmhcklkogpjaenfkg on Apr. 29, 2024.

* cited by examiner

Figure 5:
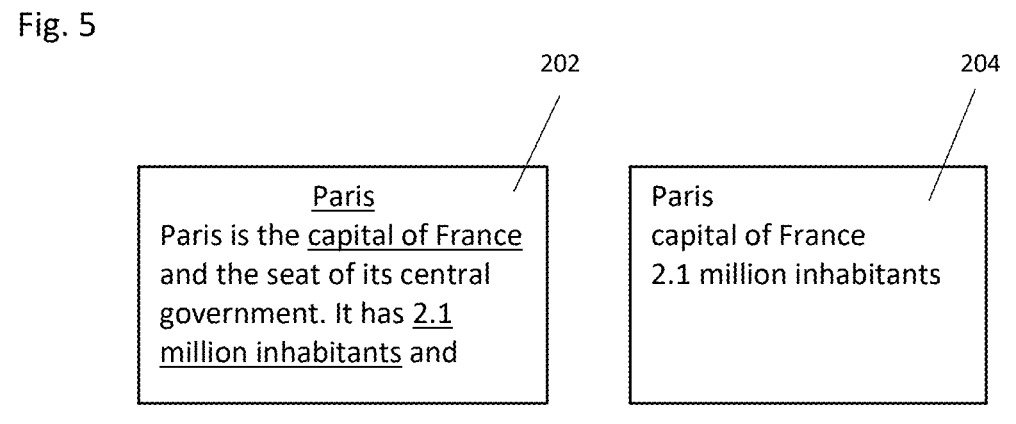

Paris
Paris is the capital of France
and the seat of its central
government. It has 2.1
million inhabitants and Paris
capital of France
2.1 million inhabitants

Figure 6:
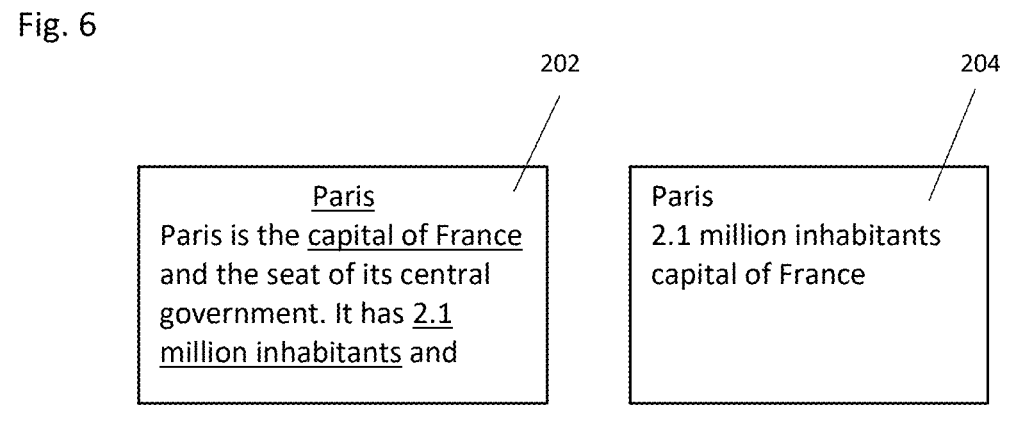

Paris
Paris is the capital of France and the seat of its central government. It has 2.1 million inhabitants and Paris
2.1 million inhabitants
capital of France

Figure 8D:
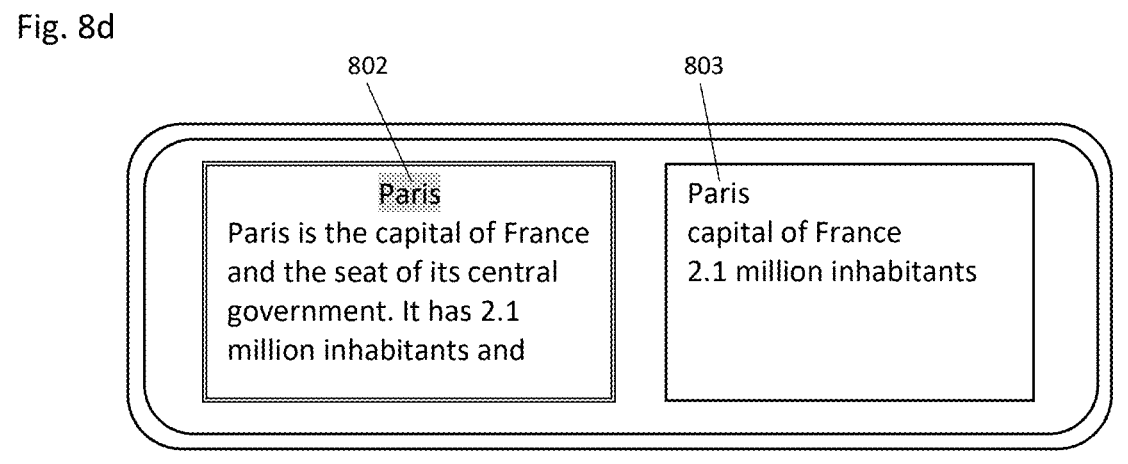

Paris

Paris is the capital of France
and the seat of its central
government. It has 2.1
million inhabitants and Paris
capital of France
2.1 million inhabitants 101    202    204

1201    1202

202    204

204     203

1. Paris
  • capital of France
  • 2.1 million inhabitants
  • Eiffel Tower
       a. built for the 1889 World's Fair
       b. constructed by Gustave Eiffel
       c. tallest structure in Paris
  • Louvre Museum
       a. national art museum
       b. housed in the Louvre Palace
       c. owns Mona Lisa by Leonardo da Vinci
  ...

2. Marseille
  • second most populous city in France
  • 870,000 inhabitants
  ...

1301

1302

1303

Source application        Operating system        Copy module of
Excerpting application

MOUSE AND KEYBOARD FUNCTIONALITY FOR EFFICIENT EXTRACTION OF CONTENT

CROSS-REFERENCE TO RELATED APPLICATION

This application claims the benefit of U.S. Provisional Patent Application 63/445,423, filed Feb. 14, 2022, the content of which is incorporated in its entirety.

BACKGROUND

Excerpting is the process of extracting information from a given text to a set of notes that can be useful as a reminder of the main points of the text later on. Excerpting is traditionally done by hand using pen and paper. It is also possible on a personal computer. That involves the following steps: Open a source document to be copied from. Further, open a document for the excerpt, hence excerpt document, for example an empty document in a text-processing application. Then copy crucial text passages of the source document to the excerpt document, thus forming an excerpt of the source document in the excerpt document. For each passage of text copied to the excerpt document, this involves a separate round of the four standard steps of user input for Copy and Paste: (a) select a text to be copied in the source document, (b) trigger the Copy command by a combination of keys on the keyboard or from a menu, (c) place the cursor in the excerpt document to show the insertion position, (d) trigger the Paste command by a combination of keys on the keyboard or from a menu, so as to insert the selected and copied text in the insertion position.

SUMMARY

A computer-implemented method and two related computer-implemented applications are described. They reveal how excerpting on the computer can be more efficient for the user than the standard Copy and Paste procedure. Given a source document and an excerpt document on the display, the method builds on a designated button that the user holds down while selecting a portion of the source document. An example of this designated button is the left mouse button, which is already held down during a standard process of selecting text with the mouse. According to the teachings of the method, the release of the designated button is recognized and in response to this release, the portion of the source document that was just selected is copied and pasted into the excerpt document, without user input after the release of the designated button. This is here referred to as copying and pasting by the CPU.

Possible definitions of the insertion positions for copying and pasting by the CPU are provided. One of them recognizes a caret position of the display container of the excerpt document and inserts relative to this position. This provides for two options for the user that are not known from standard Copy and Paste: (I) to manually provide an insertion position before selecting the material to be copied, and (II) to paste without the user manually providing an insertion position. It is shown how (II) allows the user to select a number of portions in a row, with the CPU copying and pasting them into the excerpt document in a useful order.

Other elements of the method allow for other increases in the efficiency of excerpting on the computer. In one of them, the pasted copies in the excerpt document are integrated into a hierarchically structured text. The user chooses the assignment of the copies to hierarchy levels. Formatting based on the hierarchy levels is assigned as part of copying and pasting by the CPU. This may include different numbering styles, different indenting, or different text colors for the different levels.

The first computer-implemented application described presents an excerpt document and has the CPU copy and paste into it from source documents in other applications.

The second computer-implemented application presents both a source document and an excerpt document and performs copying and pasting by the CPU within the application.

BRIEF DESCRIPTION OF THE DRAWINGS

FIG. 5 provides an example of order-preservation in an excerpt document relative to a source document.

FIG. 6 provides an example in which the excerpt document is not order-preserving relative to the source document.

FIGS. 8*a*-8*d* illustrate "Insertion after the excerpt caret position" with a case in which the user manually provides a document-initial insertion point.

DETAILED DESCRIPTION

Standard Copy and Paste allows a user to excerpt on a computer. A computer-implemented method and two closely related computer-implemented excerpting applications are described that make excerpting on the computer more efficient for the user. In particular, the number of keystrokes or mouse operations required in preparing an excerpt is reduced relative to known methods and applications.

Figure 1:
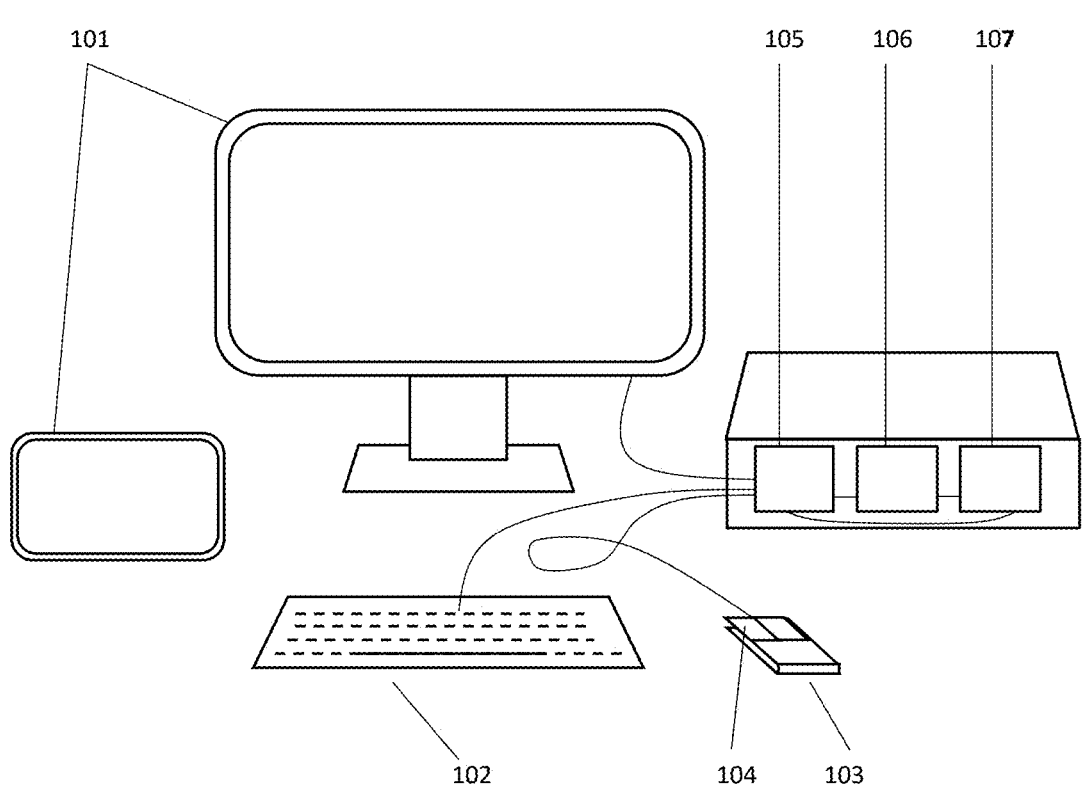
FIG. 1 is a schematic diagram of a computer for implementing the described method and the described applications, with components including a mouse, a keyboard, a display, a CPU, and other related hardware.

The improved method and applications are based on a standard information processing hardware configuration of computers as illustrated in FIG. 1. This includes one or more screens 101 that are visually accessible to a single user and which are henceforth together referred to as "the display". It includes a keyboard 102 on which the user can press keys. It includes a mouse 103 or equivalent device, such as a trackpad or a touchscreen, that allows the user to move a cursor on the display and to use a left mouse button 104 to click and make selections there. The display, the keyboard and the mouse are connected to a CPU 105. All connections are with cables or in a wireless fashion. Furthermore, the CPU may have a small amount of temporary memory of its own, is connected to a main memory (RAM) hardware component 106 and may be connected to devices or provisions for permanent storage of information, classically including a hard disk 107. In the following, the CPU temporary memory, the main memory, the permanent storage, and any further accessible memory, such as any memory in the mouse itself or in additional connected hardware as well as further accessible data storage, for example storage on the world wide web, are together referred to as "the memory/storage of the computer." An operating system is installed in the memory/storage of the computer, which manages computer hardware and software resources, among other things. The CPU can perform computations of various kinds; it can receive and react to user input on the keyboard and on the mouse; it can trigger visual output for the user on the display; it can read information from the different layers of the memory/storage; and it can save information temporarily or permanently in the different layers of the memory/storage.

FIG. 1 shows some of these elements as hardware components standing on their own, as known from a personal computer. The computer-implemented method and the corresponding computer-implemented applications equally apply where these hardware components are integrated with each other partly or completely. For example, they equally apply in tablets and smartphones, where the screen and mouse functionality are integrated into a touchscreen on the device and the keyboard may be a keyboard displayed on the touchscreen.

For the purpose of the method and the computer-implemented applications described, functional equivalents to pressing the left mouse button include pressing a single mouse button if there is only one, pressing down on a trackpad, and making contact with a finger or an appropriate object on a touchscreen. Functional equivalents to the release of the left mouse button include releasing a single mouse button if there is only one, releasing the pressure on a trackpad, and ending the contact of a finger or an appropriate object on a touchscreen.

The display may present one or more windows. A window may include one or more display containers. For example, a window in Adobe Acrobat Reader may include one display container for a pdf document and another one for the comments list. When a document is presented in a display container, a cursor position in the document and a selection in the document are related to the display container. The notion portion of a document is used here to generalize across text, drawings, pictures and other elements that may occur in a document and be part of a selection in the document's display container.

The notions select and selection in connection with portions of a document are here used in the sense of a unique way for part of a document to be singled out. This unique way entails, among other things, being highlighted on the display and being the target of the Copy command in an active display container.

The Copy command is a command used across relevant applications on Windows and macOS operating systems, among others. It is called from the application menu or main menu of the application using Edit>Copy or by the keyboard shortcut Control+C in a Windows application or Command+C in a macOS application. It copies the selection of the active display container into the clipboard of the operating system.

Standard Copy and Paste is a notion used here for the deployment of the four standard steps of user input in copying and pasting: (a) select a portion of a document, (b) trigger the Copy command, (c) place the cursor at the insertion position, and (d) trigger the Paste command (Edit>Paste or Control+V or Command+V).

Figure 2A:
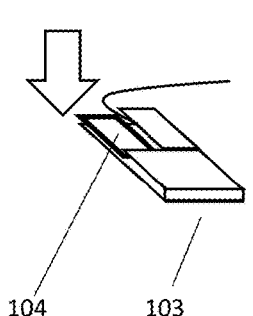
FIGS. 2*a*-2*c* show an instance of text selection with the mouse in which the release of the left mouse button triggers copying and pasting by the CPU.
Figure 2A:
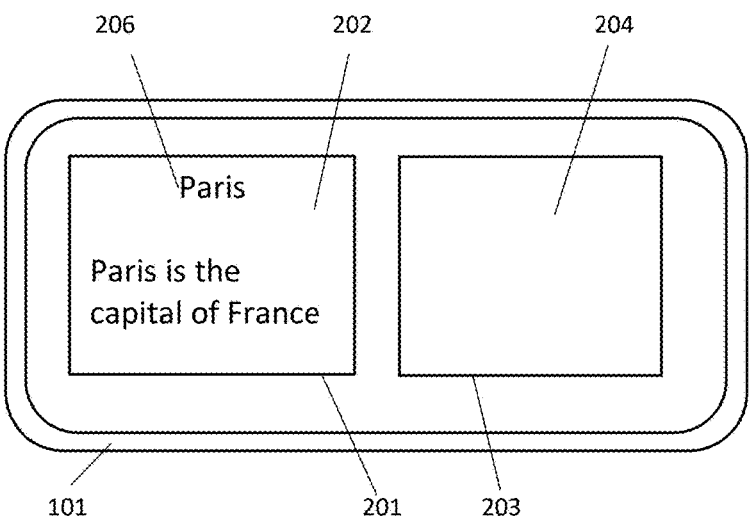
Figure 2B:
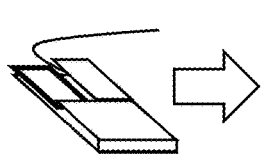
Figure 2B:
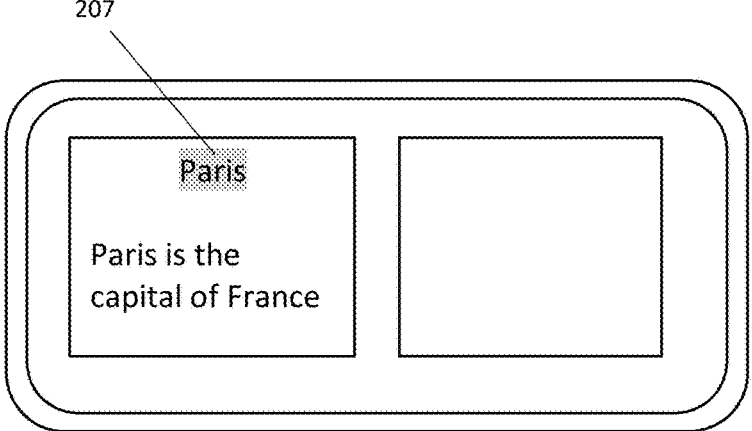
Figure 2C:
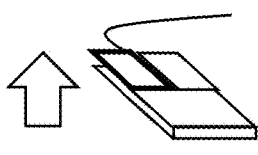
Figure 2C:
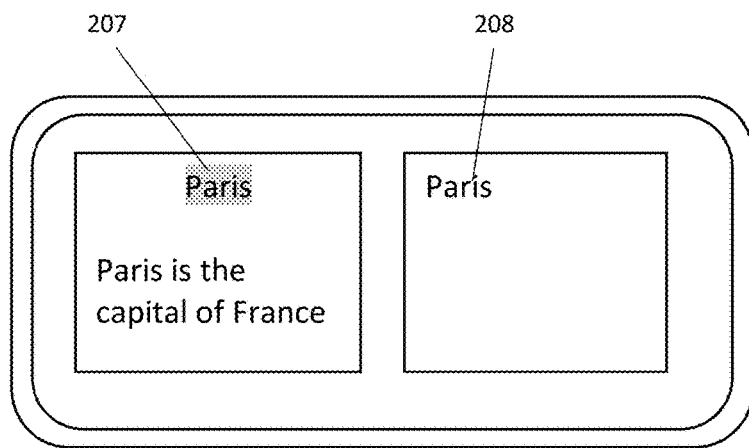

FIGS. 2a-2c illustrate elements of the method in an embodiment that involves selecting a portion of a source document with the mouse. The mouse 103 is shown with the left mouse button 104. The arrows indicate the direction of the effects of user input on the mouse. In FIGS. 2a-2c, the effects of user input on the mouse 103 are shown on the left and the corresponding changes on the display 101 are shown on the right. The display 101 displays a source display container 201 for the source document 202 and an excerpt display container 203 for an excerpt document 204. The way the user uses the mouse to select a portion of the source document in the three steps in FIGS. 2a, 2b, and 2c is the standard way of making a selection with the mouse, allowed by current standard multitasking operating systems. In FIG. 2a, the left mouse button is pressed and held down by the user to start the selection in the position of the mouse pointer on the display, which is here assumed to be the position 206 in the source document 202. In FIG. 2b, the mouse, with the left mouse button still held down, is then dragged horizontally to create a visibly highlighted selection 207 and extend a size of the highlighted selection 207 as the mouse is dragged along. The selection is highlighted by gray backgrounding in the figure: The word "Paris" in the headline is selected. In FIG. 2c, the user's release of the left mouse button ends the possibility of changing the size of the selection by dragging the mouse. The release of the left mouse-button freezes the size of the selection 207. In the embodiment of the method illustrated here, the release of the left mouse button automatically triggers that a copy of the selected portion 207 of the source document is made and pasted into the excerpt document without further user input. This pasted copy is shown as 208 in FIG. 2c.

Figure 3A:
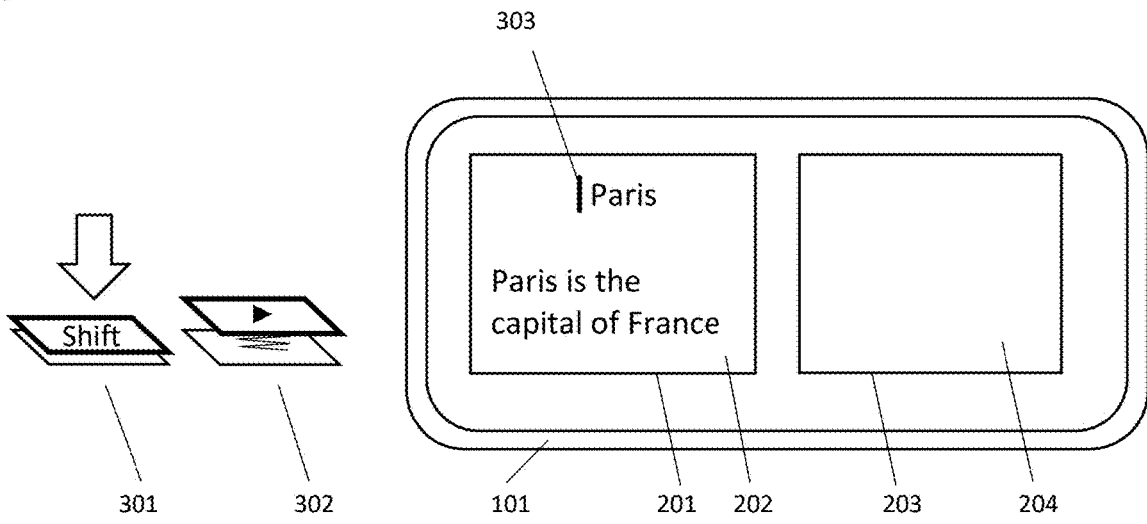
FIGS. 3*a*-3*c* show an instance of text selection with the keyboard in which the release of the Shift key triggers copying and pasting by the CPU.
Figure 3B:
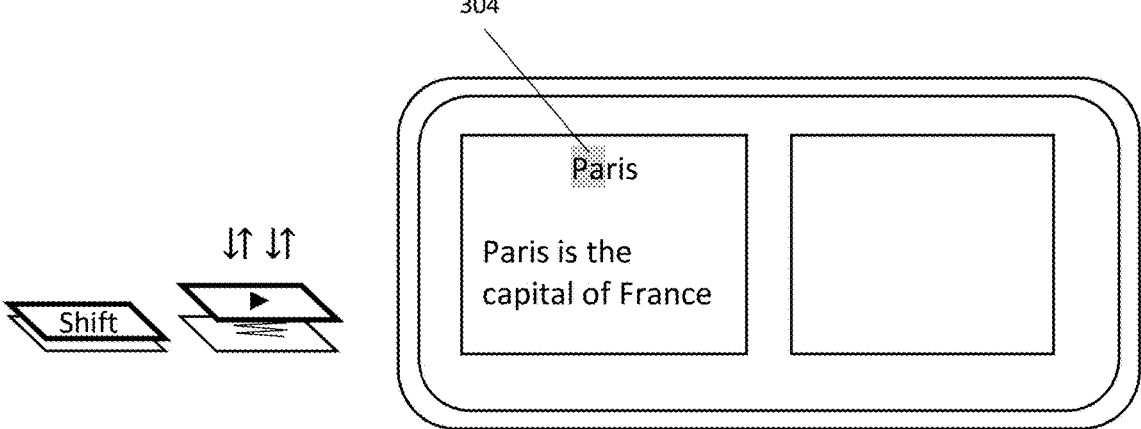
Figure 3C:
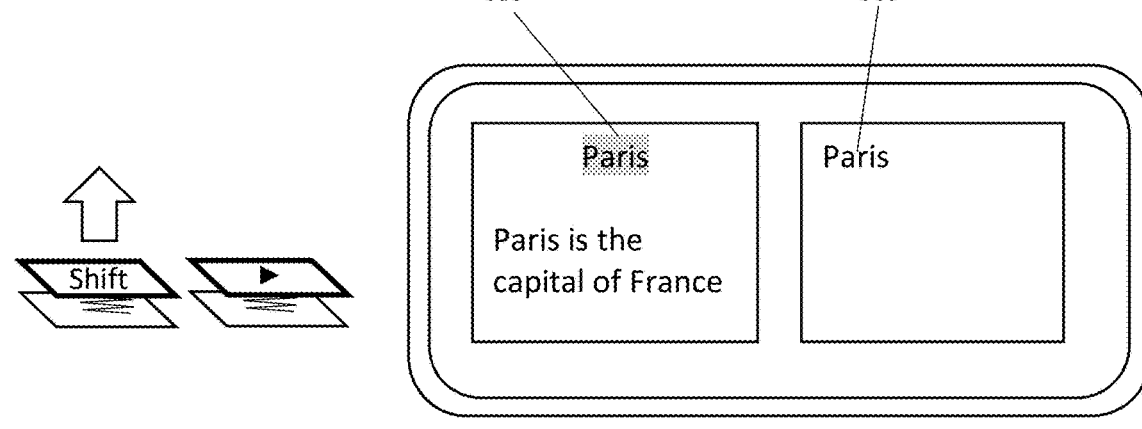

FIGS. 3a-3c illustrate elements of the method in an embodiment that involves selecting a portion of the source document with the Shift key 301 and the right-arrow key 302 on the keyboard. For each step, the effects of user input on these two keys are shown on the left and the corresponding changes on the display 101 are shown on the right. The arrows indicate the direction of the effects of user input on the two keys. The display shows the source document 202 and the excerpt document 204. The way the user uses the keyboard to select a portion of the source document during the steps in FIGS. 3a, 3b, and 3c is a standard way of making a selection with the keyboard, allowed by current standard multitasking operating systems. In FIG. 3a, the Shift key is pressed and held down by the user to start the selection in the position of the text cursor 303 on the display. In FIG. 3b, with the Shift key still held down, the right-arrow key is pressed repeatedly to create a selection and to expand its size. The selection 304 in FIG. 3b results from having pressed the right-arrow key two times. The additional use of other function keys, not shown in the figure, allows the user to select text word by word rather than letter by letter. In FIG. 3c, it is assumed that the right-arrow key has been pressed three more times, resulting in the selection 305 of the entire word "Paris." FIG. 3c shows the user's subsequent release of the Shift key, which ends the possibility of changing the selection with further pressing of arrow keys. The release of the Shift key freezes the size of the selection. In the embodiment of the method illustrated here, the release of the Shift key automatically triggers that a copy of the selected portion of the source document is made and pasted into the excerpt document without further user input. This pasted copy is shown as 306 in FIG. 3c.

Figure 4A:
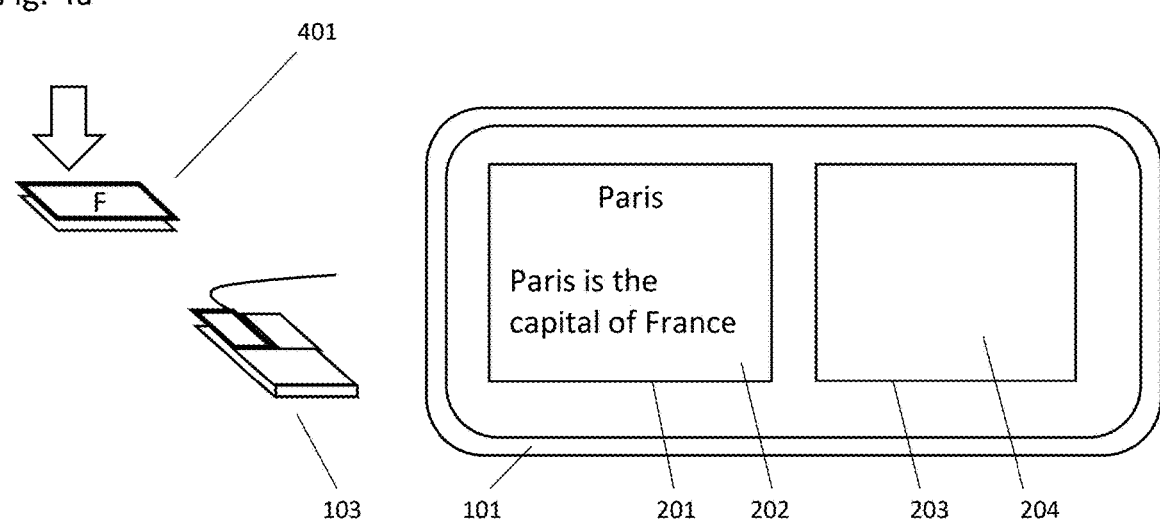
FIGS. 4*a*-4*c* show an instance of text selection with the mouse while an F key—possibly a function key—is pressed, with the release of the F key triggering copying and pasting by the CPU.
Figure 4B:
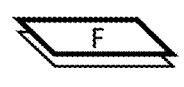
Figure 4B:
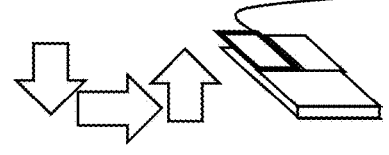
Figure 4B:
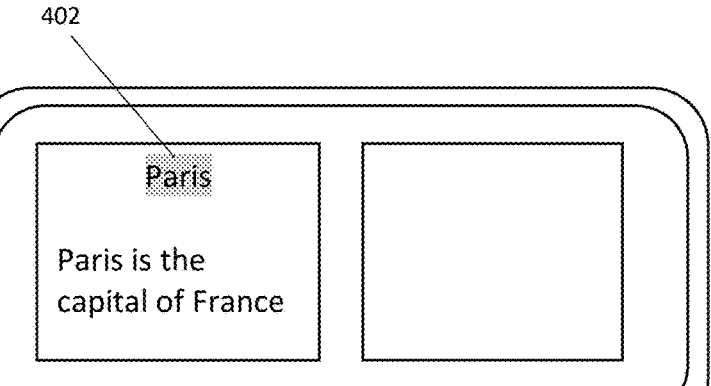
Figure 4C:
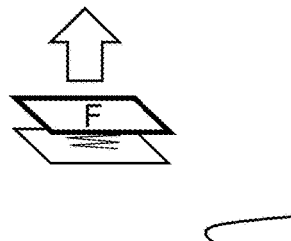
Figure 4C:
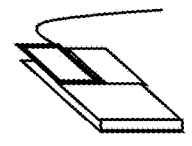
Figure 4C:
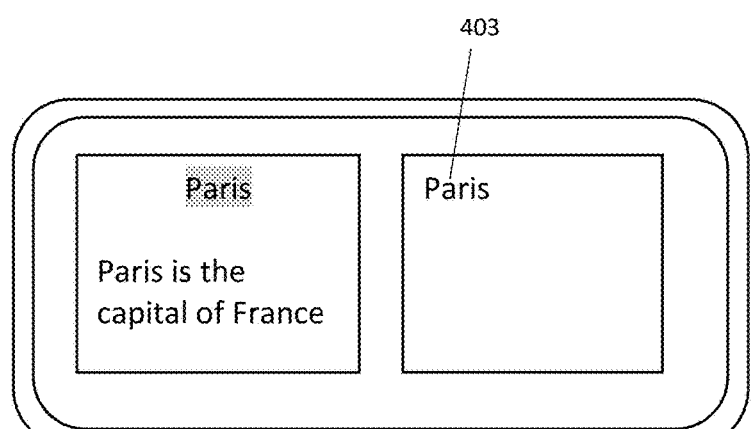

FIGS. 4a-4c illustrate elements of the method in an embodiment that involves both the keyboard and the mouse. The use of the mouse is here a standard way of making a selection, but the use of the F key—for example, a function key—is not. In FIG. 4a, the F key is pressed and held down. In FIG. 4b, with the F key still held down, the mouse is used to make a selection by pressing the left mouse button, dragging the mouse horizontally and releasing the left mouse button. This results in the selection 402 of the word "Paris." FIG. 4c shows the release of the F key. It triggers that a copy of the selected portion of the source document is made and pasted into the excerpt document without further user input. This pasted copy is shown as 403 in FIG. 4c.

The teachings of the method encompass a range of cases, including those illustrated in FIGS. 2a-2c, 3a-3c, and 4a-4c, in which a source document is present in a source display container on the display, an excerpt document is present in an excerpt display container on the display, the user is allowed to select a portion of the source document by moving a cursor along a portion of the source document while holding down a designated button—the left mouse button or the Shift key or another button—, the release of the designated button is recognized and this release triggers that a copy of the selected portion of the source document is made and pasted into the excerpt document, without user input after the release of the designated button.

The phrase copying and pasting by the CPU is used here for copying the selected portion of a document and pasting it into another document in response to the release of a button, without user input after the release of the button.

If the user input that results in copying and pasting by the CPU is repeatedly performed for different portions of the source document, each repetition is to copy a selected portion into the excerpt document. Later copies need to be placed relative to already existing material in the excerpt document. It is part of the method described to provide two possible definitions of the insertion position that lead to results appropriate for the purpose of excerpting. A definition applied by an embodiment of the method is to be present in the memory/storage of the computer, so that the CPU can access it during copying and pasting by the CPU and apply it to the excerpt document to determine a specific insertion position in the excerpt document with the help of the definition. The term "definition" here refers to rules that are implemented in the form of programmed instructions that are executed on a CPU.

For such definitions, it is useful to lean on a notion of order preservation. FIG. 5 illustrates an excerpt that is order-preserving: The copies in the excerpt document 204 occur in the same order in which their originals occur in the source document 202. In both documents, "Paris" occurs before "capital of France," and that occurs before "2.1 million inhabitants." The originals of the copies in the source document are underlined in this illustration to facilitate verifying this. FIG. 6 illustrates an excerpt that is not order-preserving: While "capital of France" occurs before "2.1 million inhabitants" in the source document 202, "capital of France" occurs after "2.1 million inhabitants" in the excerpt document 204. Order-preservation is taken to be relevant as follows: An excerpt may need to be order-preserving to some extent, if it is to be a useful reflection of the content of the source. Therefore the user should be given the possibility of achieving order-preservation in a convenient way when the user wants the result to be order-preserving.

The first definition of the insertion position incorporates from standard Copy and Paste that the user can choose an insertion position by manually placing the cursor. This is developed in the following.

Three cursor-related notions are distinguished on multitasking operating systems. The mouse pointer moves with the user's manual displacement of the mouse, while the text cursor does not. The text cursor, typically a blinking vertical line, typically marks the position of insertion into which a letter typed on the keyboard is inserted by the user. There is at most one such position on the display at a given time. In the presence of multiple display containers on the display, each display container might have a caret position of its own defined. The text cursor highlights only one of them at a given time: the one in the active display container. If a display container is in the background, its caret position is still defined as a property of the display container, but it is not highlighted by the text cursor and it does not receive keyboard input by the user.

The insertion position for pasting in standard Copy and Paste is the visible position of the text cursor in the active display container. The first definition of the insertion position relevant to the method described here uses a related but different reference point for insertion: the caret position of the excerpt document. It is here called the excerpt caret position. The first definition of the insertion position will be called "Insertion after the excerpt caret position". It will be seen that the excerpt caret position is never the position of the text cursor at the relevant times of insertion. The release of the designated button in the source document will require that the display container of the source document is active for receiving the user input, so that the display container of the excerpt document is not active and does not display a text cursor. When copying and pasting by the CPU then inserts the selected portion into the excerpt document relative to the excerpt caret position, insertion will be relative to a position with no visible text cursor. However, if the user clicks into the display container of the excerpt document and thus activates it, the excerpt caret position will be highlighted by the text cursor and the user has the possibility of placing it elsewhere with a mouse-click.

The excerpt caret position has another relevant property: It is independent of the selection in the source document. This is because the display container of the source document and the display container of the excerpt document are disjoint in their defining of and handling their caret positions and their selection ranges. Copying and pasting by the CPU allows for exploiting the consequences of this independence.

The specific definition of "Insertion after the excerpt caret position" also incorporates the ideas that in excerpting, a copy is not to be inserted inside of another copy, regardless of the location of the caret position, and that the copies are to be separated by line-breaks. The definition is:

Insertion after the excerpt caret position=i. Insert the selected portion in a new line after the line that contains the excerpt caret position, ii. except possibly in special cases involving a line-initial excerpt caret position, in which the selected portion is inserted at the excerpt caret position and any material following in the same line is demoted by one line.

The central clause is (i), but clause (ii) allows for additional possibility of placement in a line-initial excerpt caret position. The possible embodiments include one in which clause (ii) is not invoked at all, one in which only a document-initial cursor position triggers clause (ii), as well as others in which all line-initial cursor positions trigger clause (ii), possibly subject to further conditions. Also, where markers occur such as for bullets and numbering, embodiments are allowed that ignore them in determining a line-initial position.

The most substantial difference to the use of insertion at the text cursor in standard Copy and Paste resides in the independence of the excerpt caret position from the selection in the source document. In combination with copying and pasting by the CPU, insertion after the excerpt caret position gives rise to two options for the user that are not known from the insertion at the text cursor in standard Copy and Paste: (I) manually providing an insertion position before making the selection, and (II) obtaining useful results without manually providing an insertion position at all. It will first be shown how (I) allows the user to efficiently place selected portions in chosen positions, and then, how (II) allows the user to efficiently copy in an order-preserving manner.

Figure 7A:
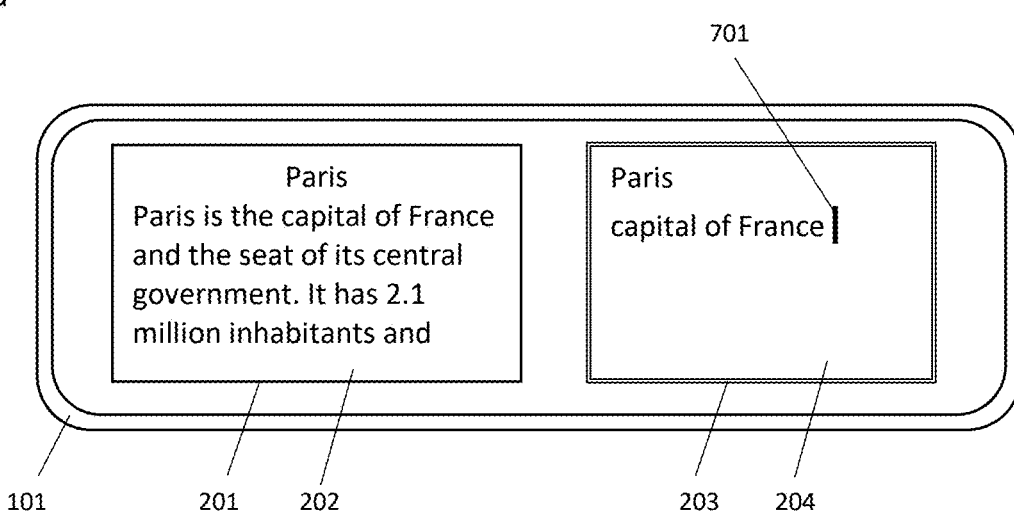
FIGS. 7*a*-7*d* illustrate "Insertion after the excerpt caret position" with a case in which the user manually provides a medial insertion point.
Figure 7B:
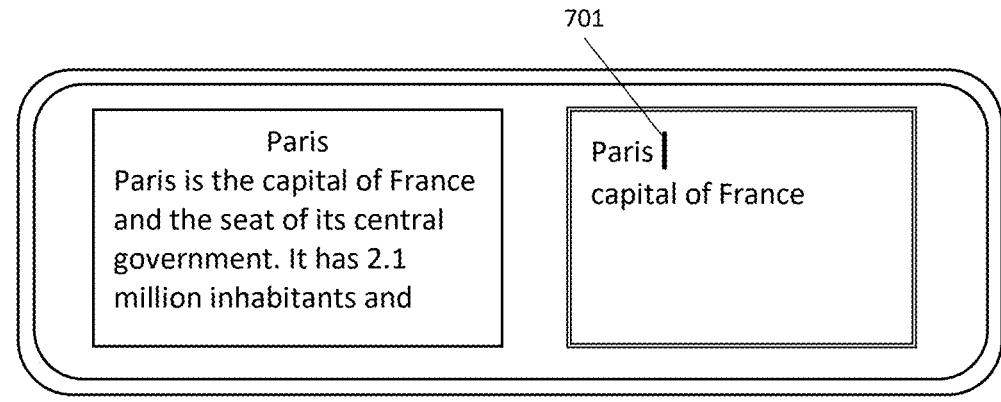
Figure 7C:
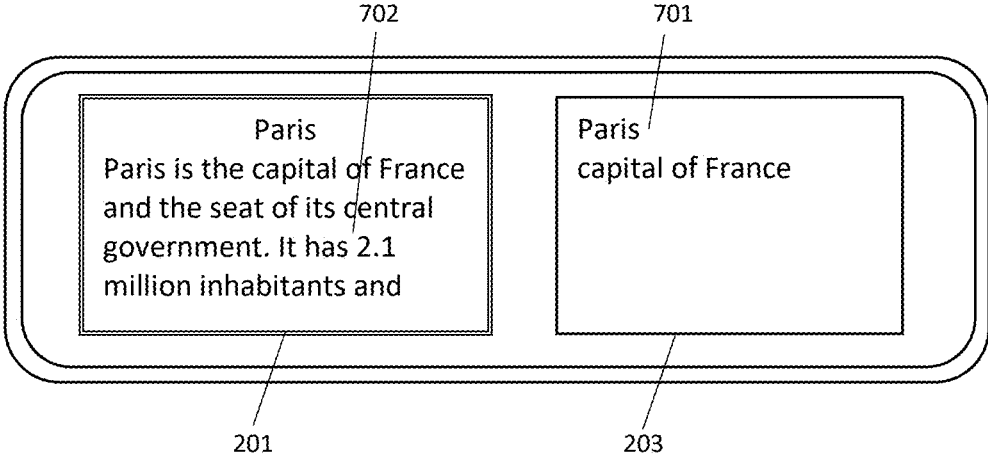
Figure 7D:
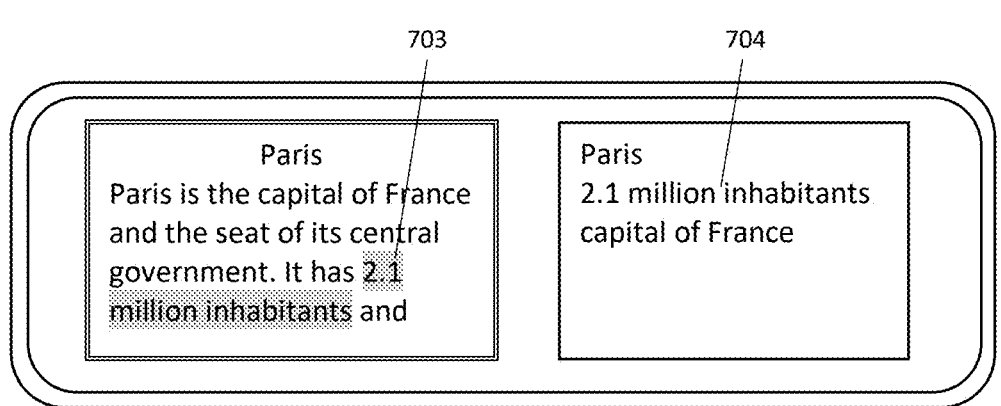

FIGS. 7a-7d illustrate the application of clause (i) of "Insertion after the excerpt cursor position," with the user providing a position for the insertion of the copy. In FIGS. 7a-10c, the active display container is framed by a double-lined border. This is the display container 203 of the excerpt document in FIG. 7a. The figure shows a state of excerpting with "Paris" and "capital of France" present in the excerpt document 204. In correspondence with its display container 203 being active, its excerpt caret position 701 is shown in a visible text cursor in the form of a vertical line. The next step in FIG. 7b shows the effect of the user's manual displacement of both the excerpt caret position 701 and the text cursor to the end of the first line so as to have the next copy inserted into the second line of the excerpt document. The user can achieve this by a mouse-click at the end of the first line in the excerpt document. Step 7c shows the effect of pressing the left mouse button in the source document, perhaps in position 702. This activates the display container 201 of the source document, deactivates the display container 203 of the excerpt document and makes the text cursor disappear in the excerpt caret position 701. Importantly, while a text cursor is no longer displayed in position 701 of the excerpt document's display container 203, the display container 203 still retains this position 701 as its caret position, the excerpt caret position, which is an abstract property. If the user now selects a portion of the source document, "Insertion after the excerpt caret position" will lead to clause (i) being invoked and the CPU will copy and paste this selection into the line after the excerpt caret position 701, thus into the line following "Paris." This is shown in FIG. 7d. The user selects "2.1 million inhabitants" in the source document, highlighted as 703. Due to copying and pasting by the CPU, the selected portion is pasted into the excerpt document as 704. Its position of insertion is as described, into the line following "Paris," i.e. into the line after the line containing the excerpt caret position 701 in FIG. 7c.

Figure 8A:
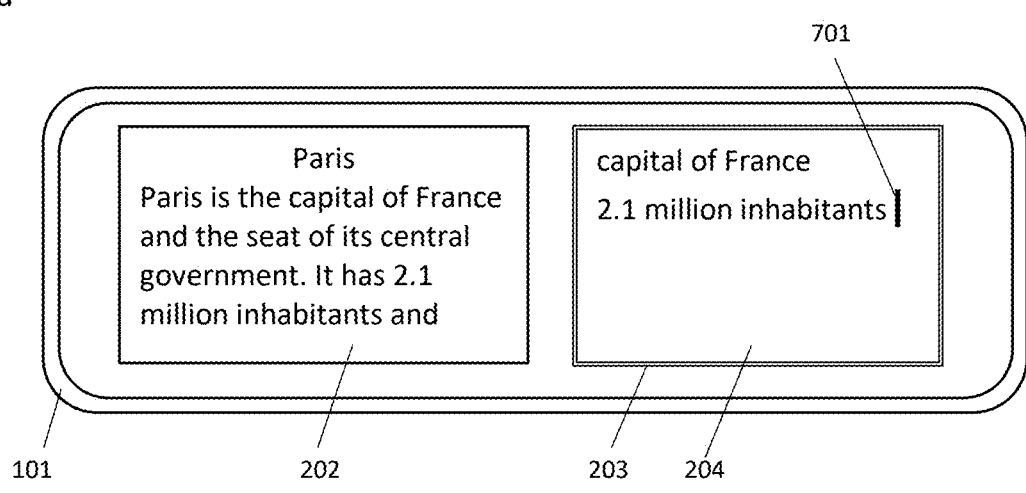
Figure 8B:
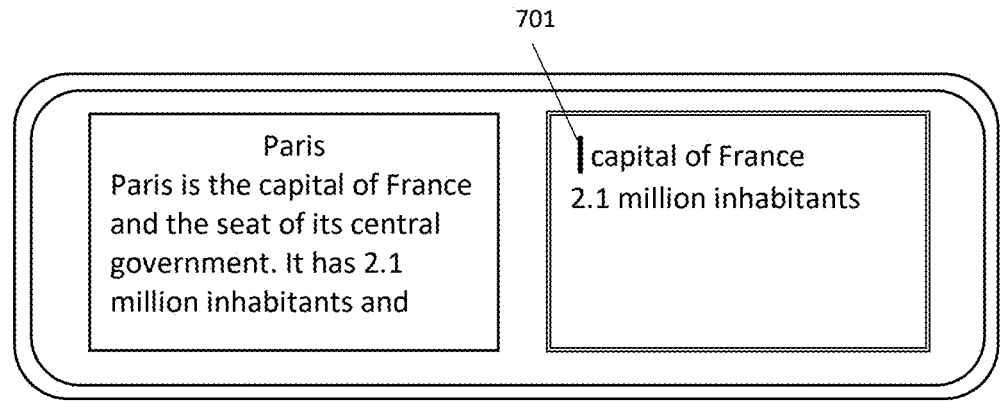
Figure 8C:
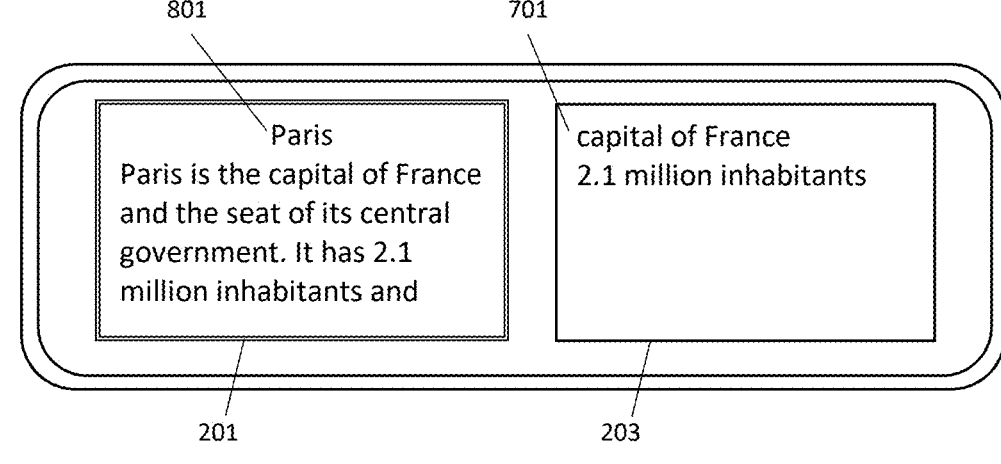

FIGS. 8a-8c illustrate an application of clause (ii) of the definition. An embodiment is assumed in which clause (ii) of the definition applies if the excerpt caret position is document-initial. FIG. 8a shows an excerpt document 204 that includes the lines "capital of France" and "2.1 million inhabitants." It is shown in an active display container 203 with a cursor at the position of the excerpt caret position 701. FIG. 8b shows the effect of the user clicking in the initial position of the excerpt document so as to have the next copy inserted there: the cursor and the excerpt caret position 701 are now in document-initial position. FIG. 8c shows the effect of the user then pressing the left mouse button in the source document, perhaps in position 801. The display container 201 of the source document is activated, the display container 203 of the excerpt document is deactivated, and the excerpt caret position 701 no longer shows a cursor. As before, the excerpt caret position 701 is nevertheless retained as an abstract property of the display container 203 of the excerpt document. FIG. 8d shows the effect of the user making a selection 802 of "Paris". Due to copying and pasting by the CPU, a copy of the selection is inserted in the excerpt document as 803. The insertion position is according to clause (ii) of the definition "Insert after an excerpt cursor:" the copy is inserted directly at the excerpt caret position 701 of FIG. 8c, demoting "capital of France" and following material by one line.

The definition "Insertion after the excerpt caret position" also provides useful results if the user does not manually provide a cursor position at all. Because of the nature of the excerpt caret position, intervening selections in the source document do not change its position. If the user does not manually displace the excerpt caret position with the cursor, its position during a step of copying and pasting by the CPU, just before the time of insertion, will therefore be the position in which the preceding step of copying and pasting by the CPU left it. It therefore matters what that position is. In standard pasting, across operating systems and applications, the text cursor is found at the end of the inserted material. This can be extended to copying and pasting by the CPU, so that copying and pasting by the CPU includes placing the excerpt caret position of the display container of the excerpt document at the end of the inserted copy, after insertion.

Figure 9A:
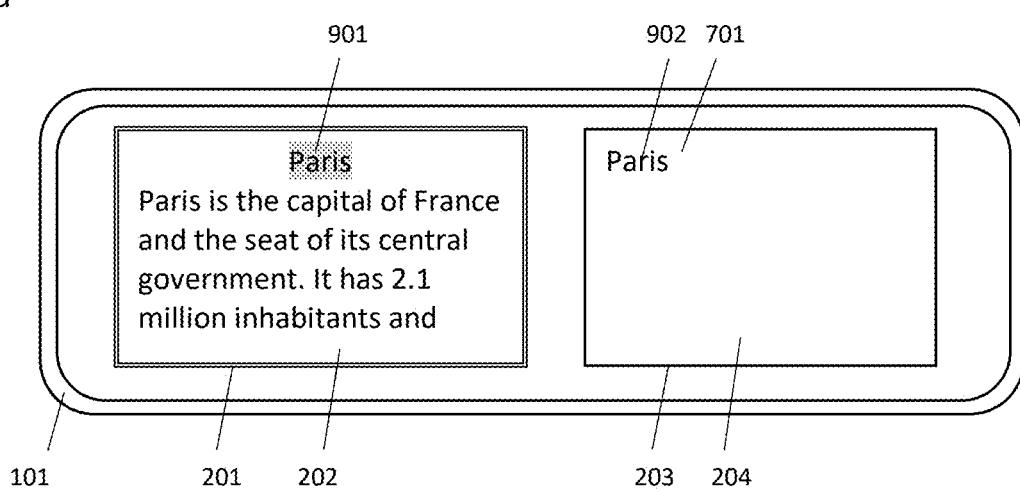
FIGS. 9*a*-9*c* illustrate "Insertion after the excerpt caret position" with a case in which the user does not manually provide an insertion position. The user selects portions of the source document in the order in which they are encountered during standard reading and the result is order-preserving.
Figure 9B:
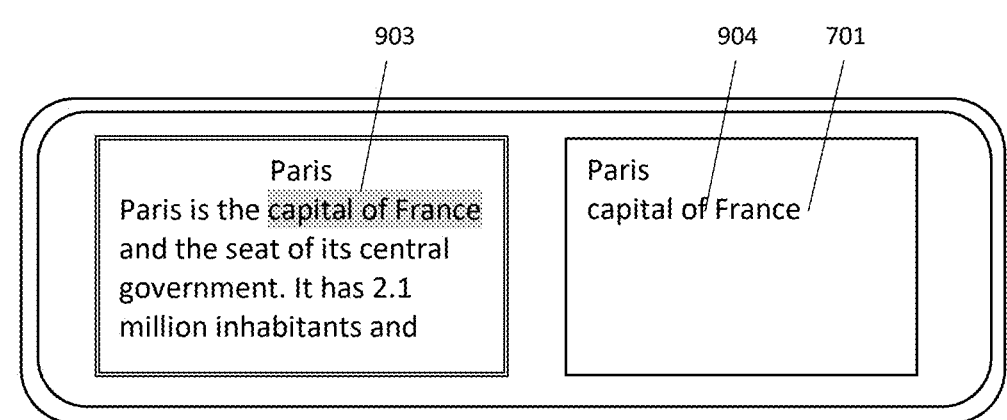
Figure 9C:
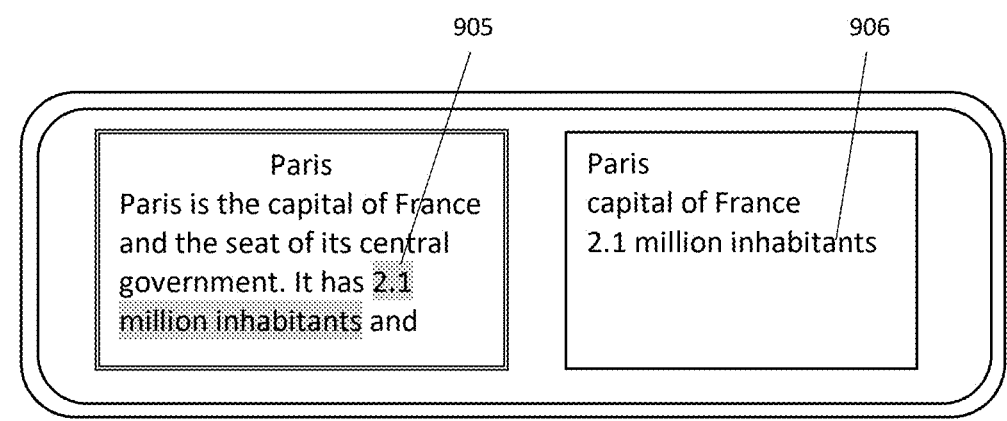

FIGS. 9a-9c show the result of selecting three portions of the source document one after the other, without manually displacing the excerpt cursor. FIG. 9a shows the display 101 following the user's selection of "Paris" in 901 and the CPU's having copied and pasted this selection as 902 into the excerpt document 204. The excerpt caret position 701 is then at the end of this pasted material. When the user next selects "capital of France" in 903 in FIG. 9b, the CPU will place a copy of it in the line after the excerpt caret position 701 of FIG. 9a. This is the result shown in FIG. 9b for the copy 904 in the excerpt document. Furthermore, in FIG. 9b, the excerpt caret position 701 follows the inserted material "capital of France" after pasting. In FIG. 9c, the user selects "2.1 million inhabitants" in 905 and the CPU copies and pastes this into the excerpt document according to the definition: into the line following the excerpt caret position 701 in FIG. 9b, thus into the line after "capital of France". The copy placed there is 906 in FIG. 9c.

In FIGS. 9a-9c, portions occurring earlier in the source document were selected before portions occurring later in the source document. It can be seen in FIG. 9c that the resulting excerpt is order-preserving relative to the source document. FIGS. 9a-9c therefore also illustrate how the definition "Insert after the excerpt cursor," without manual displacement of the cursor by the user, leads to order-preserving copies where the user copies earlier portions of the source document before later portions.

Figure 10A:
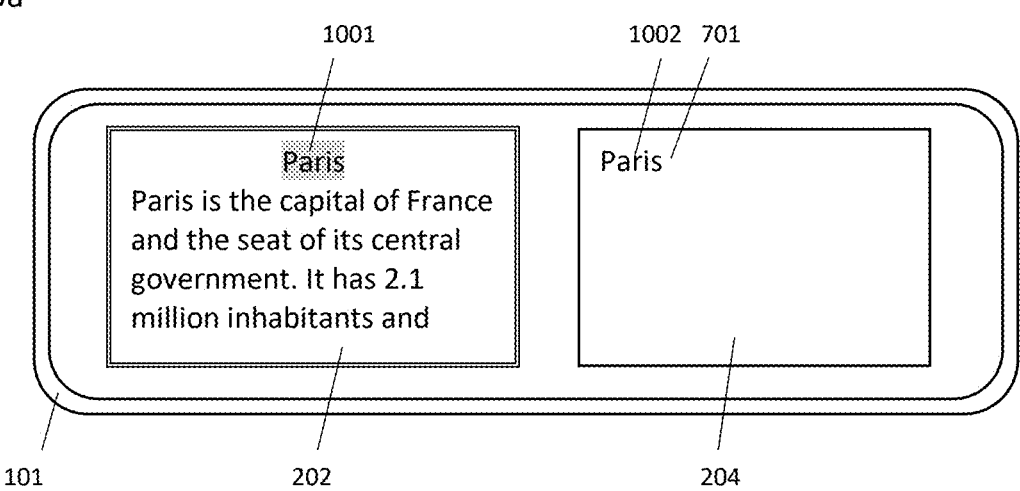
FIGS. 10*a*-10*c* illustrate "Insertion after the excerpt caret position" with another case in which the user does not manually choose an insertion position. The user here selects portions of the source document against the order in which they are encountered during standard reading and the result is not order-preserving.
Figure 10B:
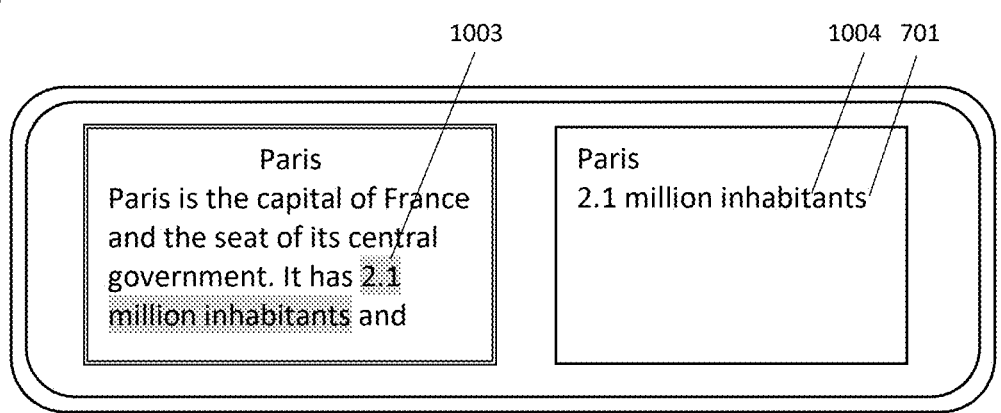
Figure 10C:
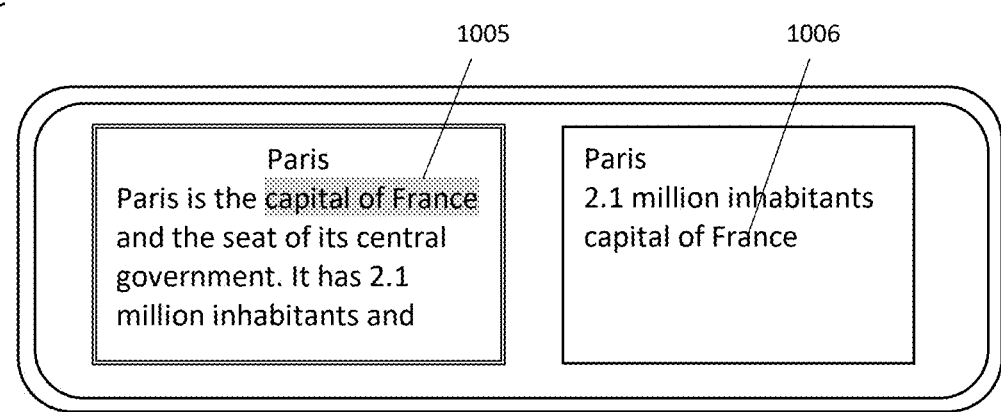

FIGS. 10a-10c show the result of the definition "Insertion after the excerpt caret position" when a portion occurring later in the source document is selected before a portion occurring earlier in the source document. FIG. 10a is the state after the user has selected "Paris" in 1001 and the CPU has copied and pasted it to 1002. In FIG. 10b, the user selects "2.1 million inhabitants" in 1003, which is copied and pasted to 1004 by the CPU, inserted in the line after the line of the excerpt caret position 701 in FIG. 10a. In FIG. 10c, then, the user goes back in the source text and selects "capital of France" in 1005, which occurs before "2.1 million inhabitants" in the source text. The CPU copies and pastes this to 1006, inserting it in the line after the line of the excerpt caret position 701 in FIG. 10b. The resulting excerpt in FIG. 10c is not order-preserving relative to the source document. This shows that when the definition "Insertion after the excerpt caret position" is used without manual displacement of the cursor by the user, order-preservation is not guaranteed by the definition. The user has to select portions occurring earlier in the source-document before selecting portions occurring later in the source document to achieve order preservation.

Selecting portions occurring earlier before portions occurring later in the source document is synchronous with the standard direction of reading: Portions occurring earlier are read before portions occurring later in a standard process of reading. The definition "Insertion after the excerpt caret position" therefore makes it easy for the user to achieve order-preservation in successive selections: The user merely needs to select the portions in the order in which the user encounters them during normal reading of the document.

In phases of order-preserving copying, like the ones in FIGS. 9a-9c, the four steps of user input in standard Copy and Paste are reduced to one: only selecting is required from the user, while the CPU takes on copying and pasting. The sequence of FIGS. 9a-9c also illustrates that the user need not take the mouse or their attention away from the source document during such a sequence of order-preserving copying: No user-input is required in the display container 203 of the excerpt document 204. All user input is in the display container 201 of the source document 202, which remains active across FIGS. 9a-9c.

Other embodiments may use other definitions of the insertion position for copying and pasting by the CPU. One alternative definition is provided here. It is based on order-preservation as a strict requirement on the result. If order preservation is strictly required, a position of insertion can be derived from this requirement. For this, order-preservation may be more formally defined as a restriction on all pairs of copies: Order preservation obtains if, for each pair of copies, one copy precedes another if its original precedes the original of the other. This definition may be transposed to pairwise instructions for the insertion as follows:

Insertion by order preservation=Let a new copy follow an existing copy in the excerpt document if the original of the new copy follows the original of the existing copy in the source document, and let the new copy precede an existing copy in the excerpt document if the original of the new copy precedes the original of the existing copy in the source document.

The notions of preceding and following in these definitions are used in the sense of preceding or following somewhere in the document, not necessarily in adjacent position. The application of this second definition is illustrated in FIGS. 11a, 11b and FIGS. 12a, 12b.

Figure 11A:
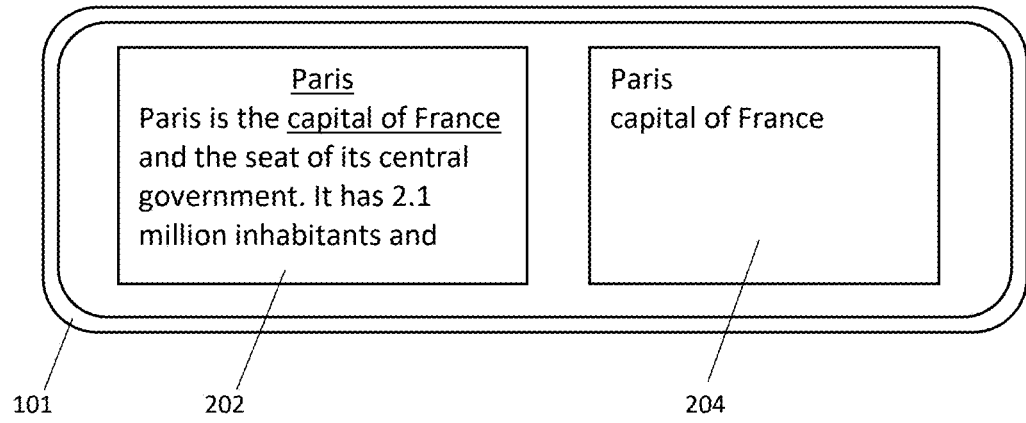
FIGS. 11*a*-11*b* illustrate "Insertion by order-preservation" with a case in which the user selects a portion that follows previously selected portions of the source document.
Figure 11B:
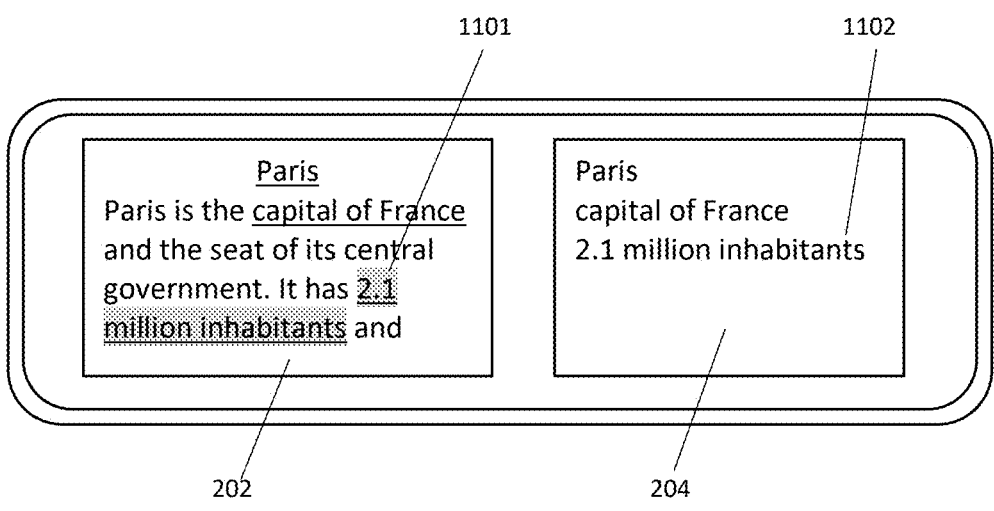

FIG. 11a shows a state of the excerpt after copying "Paris" and "capital of France." The originals of the copies are underlined. FIG. 11b shows the effects of the user selecting "2.1 million inhabitants" in 1101 and of the CPU inserting it in 1102 according to "Insertion by order preservation." By this definition, "2.1 million inhabitants" must be inserted to follow "Paris" in the excerpt document because "2.1 million inhabitants" follows "Paris" in the source document. And "2.1 million inhabitants" must be inserted to follow "capital of France" in the excerpt document because "2.1 million inhabitants" follows "capital of France" in the source document. Thus, "2.1 million inhabitants" must be inserted to follow both "Paris" and "capital of France" in the excerpt document.

Figure 12A:
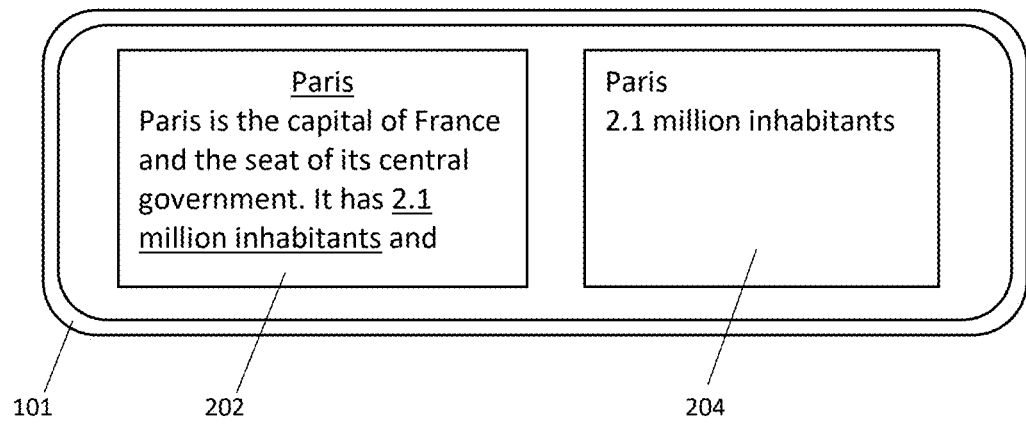
FIGS. 12*a*-12*b* illustrate "Insertion by order-preservation" with a case in which the user selects a portion in between previously selected portions of the source document.
Figure 12B:
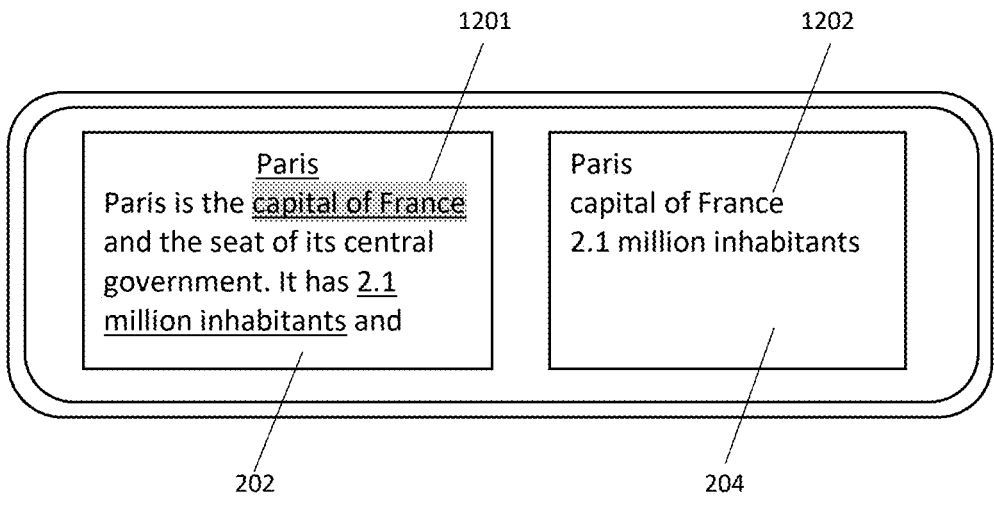

FIG. 12a shows a state of the excerpt after copying "Paris" and "2.1 million inhabitants." FIG. 12b shows the effects of the user selecting "capital of France" in 1201 and of the CPU inserting it in 1202 according to the "Insertion by order preservation" definition. By this definition, "capital of France" must be inserted to follow "Paris" in the excerpt document, because the original of "capital of France" follows the original of "Paris" in the source document. And "capital of France" must be inserted to precede "2.1 million inhabitants" in the excerpt document because the original of "capital of France" precedes the original of "2.1 million inhabitants" in the source document. Thus "capital of France" must be inserted between "Paris" and "2.1 million inhabitants."

Not all embodiments of the method can easily make use of "Insertion by order preservation." The calculation of the position of insertion of a new copy requires information about the source positions of the copies that were made before. The second computer-implemented application that is described later in this document has an optional addition that shows how a definition of this kind can be implemented in more detail.

The method allows that the release of the designated button will trigger copying and pasting by the CPU only if certain relevant conditions are met. For example, where the Shift key is the designated button, a release of the Shift key might trigger copying and pasting by the CPU only if it is preceded by a release of the left- or right arrow keys or of other keys involved in changing the selection with the keyboard. Another relevant condition may be that an excerpt mode is activated, as described in the following.

The method includes the use of an excerpt mode as a way of distinguishing the standard effect of the release of the designated button from its extended effect that includes copying and pasting by the CPU. With excerpt mode deactivated, only the standard effect is executed. With excerpt mode activated, copying and pasting by the CPU is executed in addition. A deactivated excerpt mode then allows the user to work in the source document with the mouse and the left mouse button without triggering copying and pasting by the CPU. With excerpt mode activated, the release of the left mouse button leads to the CPU copying and pasting the selected portion into the excerpt document.

Activation and deactivation of the excerpt mode is to occur in response to user input. That can take different forms. For example, the user may be provided with a switch on the display for activating and deactivating excerpt mode. The activation of excerpt mode can also be a secondary effect of other user choices. For example, the opening of an excerpt document in a new display container can activate excerpt mode and the closing of the display container with the excerpt document can deactivate excerpt mode.

Once a copy of the selected portion is made by the CPU upon the release of the designated button, it may be adjusted before it is pasted into the source document. For example, if the excerpt document has a uniform font and a uniform font size, the copy may be adjusted to be in that font and in that font size. Another example is that trimming of whitespaces can be applied to the copy at its left and right edges. The method optionally includes yet another kind of adjustment: The user may be given options like "Remove colors in copies" and "Remove underlining in copies," which the user can individually activate or deactivate. Depending on the activation status, the relevant property, such as text color or underlining, will then either be removed from text in the copy or will not be removed. Other adjustments offered to the user in this way can be to remove boldfacing, to remove italicizing, to disable clickable links, to capitalize the first word of text in the copy, or to adjust the grammar of text in the copy to its new context in the excerpt document. User choices of the kind described here can contribute to the efficiency of excerpting on the computer.

Figure 13:
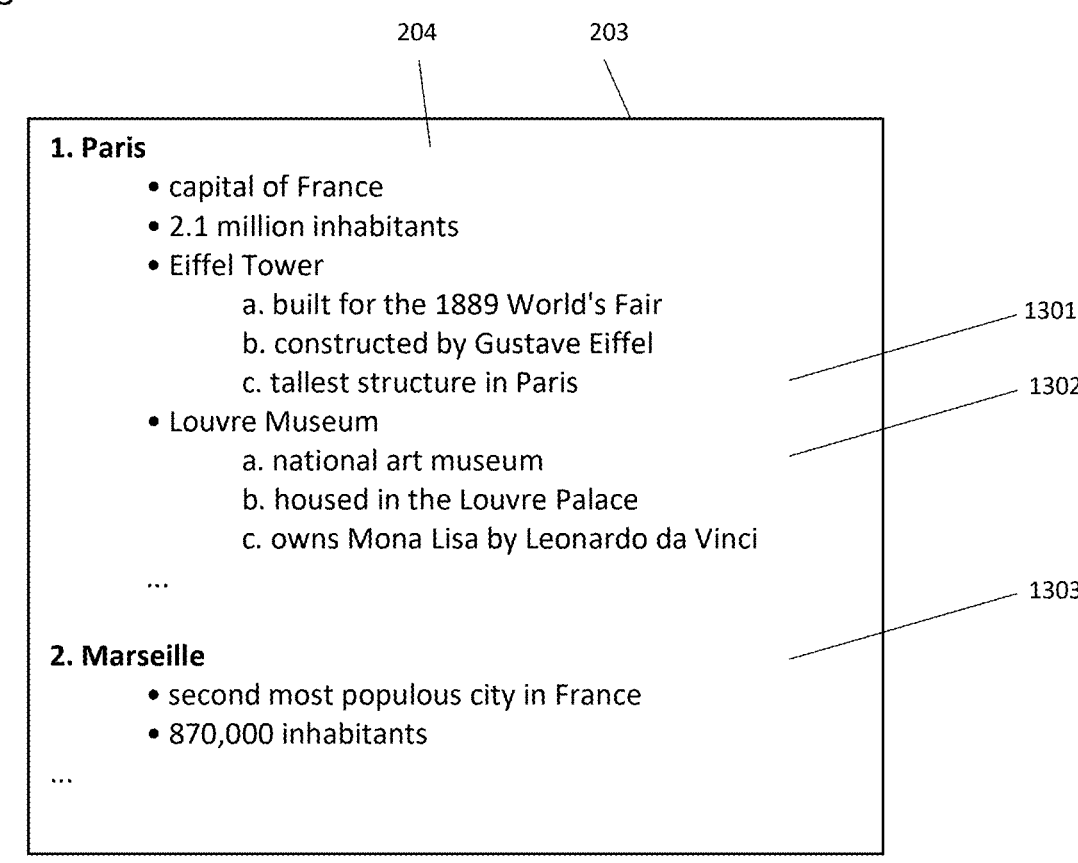
FIG. 13 provides an example of an excerpt document with formatting based on a hierarchy of levels.

The method optionally includes another way to make excerpting on the computer more efficient. This relates to formatting of the excerpt document that is based on a hierarchy of levels. Such a hierarchy of levels is illustrated in FIG. 13. Three levels can be distinguished in this example, each with certain formatting properties. Level 1 is used to set apart the headlines "1. Paris" and "2. Marseille." The formatting properties of level 1 are decimal markers "1., 2., 3., . . . ," boldfacing, and no indenting. Level 2 includes all lines with a bullet point. The formatting properties of level 2 are using bullet points, one step of indenting, and no boldfacing. Level three includes all lines starting with lower-case Latin markers "a., b., c., . . . ". The formatting properties of level 3 are such lower-case Latin markers, two steps of indenting and no boldfacing.

The three levels underlying the formatting in FIG. 13 are hierarchically organized: level 1 is higher than level 2, which is higher than level 3. A possible indication of this is the different amount of indenting for each level: Lower levels are indented more than higher levels. If indenting was generated automatically by the system behind FIG. 13, the system would have to rely on such a hierarchy among the three levels.

A clearer indication of the hierarchical organization behind FIG. 13 relates to the resetting of ordered markers like "1., 2., 3., . . . " and "a., b., c., . . . " The relevant regularity is that their sequencing is reset after an element of a hierarchically higher level is encountered. For example, the marker "c." at point 1301 is not followed by a marker "d." at point 1302. Instead, the line at point 1302 shows resetting to the marker "a.". These are markers of level 3 and the reason for the resetting is the intervening line ". Louvre Museum," which belongs to level 2. For this resetting, it is important that level 2 is higher than level 3. The inverse case can be seen in the interaction of level 1 with level 2: The numbering of level 1 is not similarly reset if an element of level 2 is encountered. Thus, after "1. Paris" at the beginning of the document, there are several lines with bullet points, belonging to level 2. However, the next element of level 1 that is encountered after these, at point 1303, is "2. Marseille," not "1. Marseille". For the absence of resetting in this case, it is important that level 2 is lower than level 1, rather than higher. Thus, resetting and not resetting of markers relies on a hierarchy among the levels. Levels that are elements of a hierarchy of levels are here also called hierarchy levels.

If the user were to create an excerpt that is structured into such hierarchy levels using standard Copy and Paste, establishing the formatting for the additional hierarchical structure would involve a good deal of work by the user. It would involve the work of typing the markers or otherwise getting them right in coordination with a list-generating word-processing function, and it would most likely involve manually applying the remaining hierarchy-specific formatting to individual lines or sometimes to sequences of adjacent lines belonging to the same level.

On the other hand, the method described can be optionally extended to include ways for the user to work with such a hierarchy of levels quite efficiently. A central element of such an extension is to give the user control over the hierarchy level of an upcoming copy before it is made. Copying and pasting by the CPU can then be extended to include that the copy receives a marker and other formatting on the basis of its hierarchy level. In the example in FIG. 13, this other formatting can be indenting and boldfacing.

Copying and pasting by the CPU will then also need to include that the new copy is integrated into the excerpt document in such a way that its hierarchy level can be determined on the basis of the copy and this hierarchy level remains accessible in the excerpt document, so that hierarchy-sensitive calculations can access it there. This is important, for example, for the resetting of markers: It may be, for example, that the copy needs to trigger resetting of markers on copies following it that are not yet made. The hierarchy level can allow for its being determined on the basis of the copy and its being accessible in the excerpt document in different ways. For example, an abstract representation of the excerpt document content might structure the copies in a hierarchical way that mirrors the hierarchical structure discussed here. Another example is that the copies are organized as a series of paragraphs in the excerpt document, where each paragraph carries abstract information about its hierarchy level.

Figure 14A:
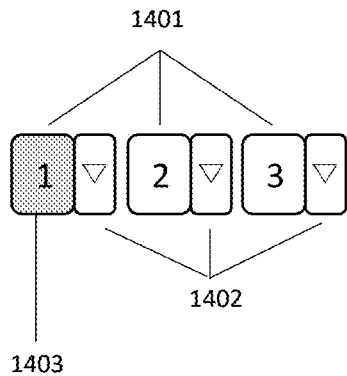
FIGS. 14*a*-14*c* illustrate an example of a user control for formatting copies based on a hierarchy of levels as part of copying and pasting by the CPU.
Figure 14B:
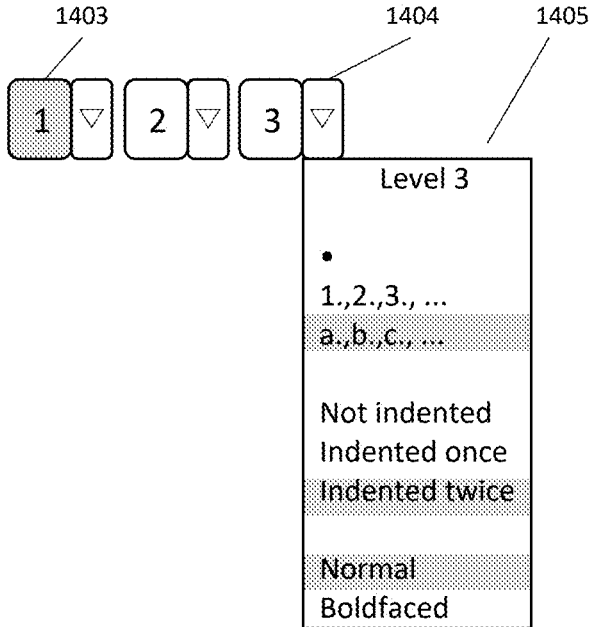
Figure 14C:
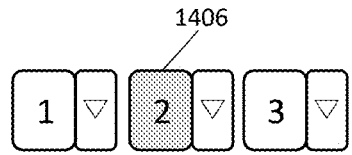

In a further optional extension of the method, a particular kind of control on the display allows the user to efficiently work with such hierarchy levels. An embodiment of such a control is illustrated in FIGS. 14a-14c. In FIG. 14a, the control is shown with two buttons for each level next to each other: level-buttons 1401 and property buttons 1402. As illustrated in FIG. 14b, when the user clicks on a property button, here property button 1404, a menu is opened, here 1405, that allows the user to choose formatting properties of the associated level. The level buttons are part of a system of selecting the hierarchy level of the next copy that is made. One level is highlighted in the control: the selected one, the one that will be applied to the next copy. In FIGS. 14a and 14b this is level 1, highlighted by darkening of the button 1403. The user can select another level by clicking on another level button, as illustrated in FIG. 14*c*: Assuming level 1 was selected before, clicking on the level button 1406 in FIG. 14*c* will select level 2, shown by highlighting on the clicked button 1406. The next copy will then be supplied with a marker, indented, and otherwise formatted according to the formatting properties of level 2.

Embodiments with a control as shown in FIG. 14*a*, 14*b* are compatible with automating some of the formatting choices and thus not leaving them up to the user. For example, indenting can be set to no indenting for the highest level, one step of indenting for the second-highest level, two steps for the next highest level, etc.

Figure 15:
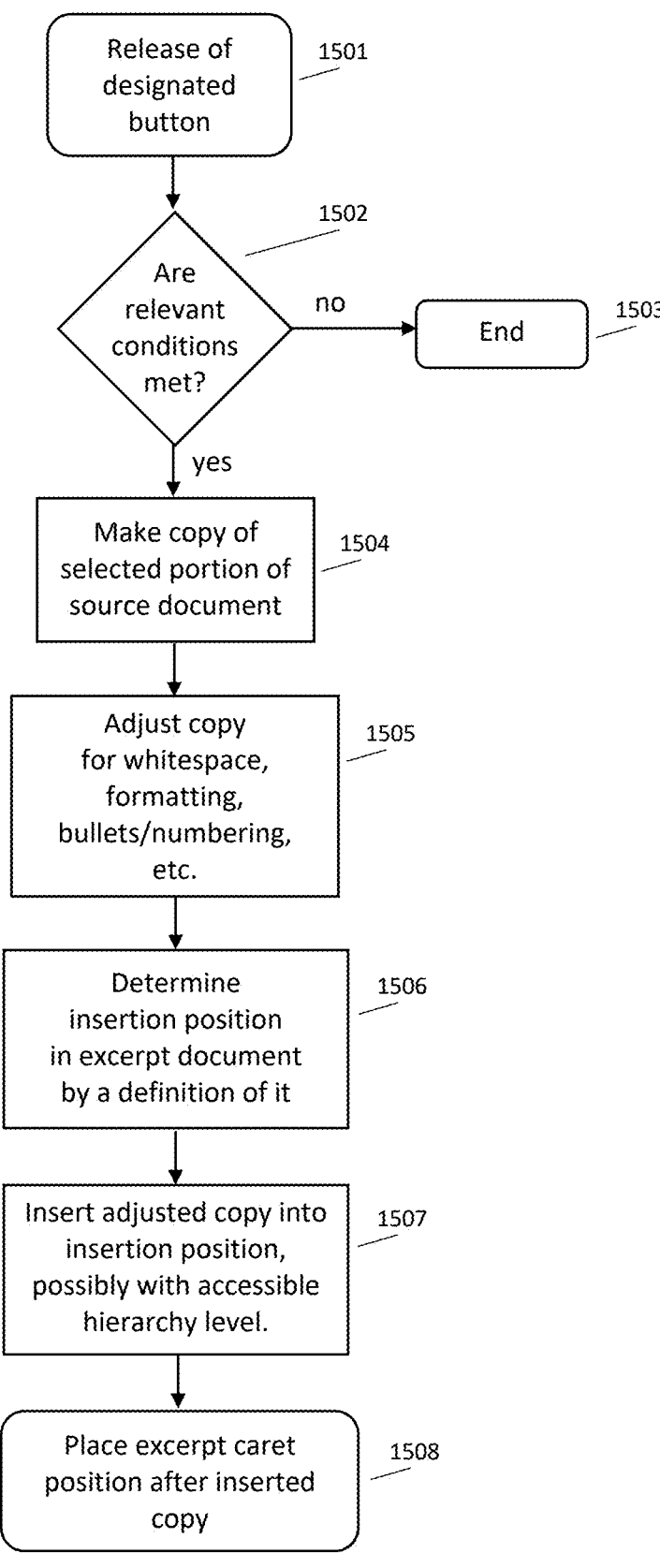
FIG. 15 provides a flowchart of the possible execution of a range of obligatory and optional elements of the method described.

The flowchart in FIG. 15 shows an embodiment of elements of the method in which a range of these elements are executed in steps. The flowchart is not to constrain the method or its elements, but to show a typical execution of its elements. After the release of the designated button in step 1501 of FIG. 15, step 1502 verifies if relevant conditions are met. These may include the possible activation of excerpt mode. If the conditions are not met, for example if an excerpt mode is used but deactivated, the process ends in step 1503. If the relevant conditions are met, step 1504 makes a copy of the selected portion of the source document. In step 1505, the copy can then be adjusted by trimming whitespaces, changing formatting, or in other ways. This includes the possible addition of markers and other formatting based on a hierarchy of levels. In step 1506, the insertion position in the excerpt document is determined by applying a definition of this insertion position, such as "Insertion after the excerpt caret position" or "Insertion by order preservation" or other definitions not discussed here. Where the adjustment of the copy depends on the insertion position, the order among steps 1505 and 1506 will be reversed. In step 1507 of the flowchart, the adjusted copy resulting from step 1505 is inserted into the insertion position determined in step 1506; in the context of a hierarchy of levels, this step also needs to make sure that the copy is integrated into the excerpt document with the user-selected hierarchy level accessible in the excerpt document. Finally, in step 1508, the excerpt caret position is placed at the end of the inserted copy in the excerpt document.

The method can be implemented on a single computing device as shown in FIG. 1 with its components 101-107. Alternatively, the method may be implemented across a combination of two computing devices. Each of the computing devices may include the components 101-107 in FIG. 1. The second computing device may in particular be a mobile device such as a smartphone or a tablet. The two devices may be connected by a cable or a local wireless connection, for example using Bluetooth or connections to a common Wi-Fi network. The optional implementation of the method across the two devices presents the source document in a display container on the display of the first computer and the excerpt document in a display container on the display of the mobile device. After the release of the designated button on the first computer, the CPU of the first computer makes a copy of the selected portion of the source document. It then sends the copy to the mobile device. The CPU of the mobile device pastes the copy into the excerpt document on the display of the mobile device. The definition of the insertion point is held in the memory/storage of the mobile device. No user input on either of the two computing devices is required after the release of the designated button. The first computer is configured to send the copy to the mobile device after the copy is made, allowing for adjustments to the copy before it is sent. The mobile device is configured to receive the copy when it arrives and to then paste it into the excerpt document.

Copying and pasting by the CPU, implemented on one computing device, is possible across two different applications or within the same application. Specifics of the former case are described in a first computer-implemented excerpting application in the following. Specifics of the latter case are described later in this document in a second computer-implemented excerpting application.

The first computer-implemented excerpting application comprises elements for excerpting from another application, here called a source application, running on the same multi-tasking operating system. The first element of the excerpting application is a display container for displaying an excerpt document, presented in a window of the excerpting application. The second element is an event listener for mouse and keyboard events, listening globally within the operating system so as to receive such events from the source application. The third element is a copy module. It receives the notifications of the global event listener. When it receives a left-mouse-up event or a key-up event of a Shift key, it triggers copying and pasting by the CPU.

FIGS. 2*a*-2*c* are used here to describe the role of these elements in an embodiment of selecting a portion of a document in the source application with the mouse. The display container 201 that contains the document 202 is presented by the source application. The display container 203 that shows the excerpt document 204 is presented by the excerpting application. FIG. 2*a* shows the effect of the user pressing the left button 104 of the mouse 103 in position 206 of the active display container 201. FIG. 2*b* shows the effect of the user dragging the mouse to create the selection of the word "Paris" in 207. FIG. 2*c* shows the effect of the user releasing the left mouse-button. This induces a left-mouse-up event in the source application. The left-mouse-up event freezes the size of the selection 207. By the teachings of the excerpting application described, the global event listener of the excerpting application picks up this left-mouse-up event and passes it on to the copy module. The copy module verifies if the reported event is a left-mouse-up event. It may also verify whether other relevant conditions are met. If it is a left-mouse-up event and relevant conditions are met, the copy module of the excerpting application triggers that a copy of the selected portion 207 is made and pasted into the excerpt document, where it is shown as 208 in FIG. 2*c*. Since the copy module is part of the excerpting application, it is not trivial for the copy module to make a copy of the selection 207 of the source application. The discussion will return to this.

FIGS. 3*a*-3*c* are used to describe the role of the elements of the excerpting application in an embodiment in which a portion of a document in the source application is selected with the keyboard. The display container 201 is presented by the source application, the display container 203 by the excerpting application. FIG. 3*a* shows the effect of the user pressing the Shift key that marks the cursor position 303 as the beginning of a selection. FIG. 3*b* shows the expansion of the selection by repeated pressing of the right-arrow key. Assuming that the selection has been expanded to the entire word "Paris," FIG. 3*c* shows the effect of the release of the Shift key. The release of the Shift key triggers a key-up event of the Shift key, which freezes the size of the selection 305. By the teachings of the excerpting application described, the global event listener of the excerpting application picks up this key-up event of the Shift key and sends it to the copy module of the excerpting application. The copy module verifies if the reported keyboard event is a key-up event and if other relevant conditions are met. If so, the copy module triggers that a copy of the selection 305 is made and pasted into the excerpt document as 306.

Figure 16:
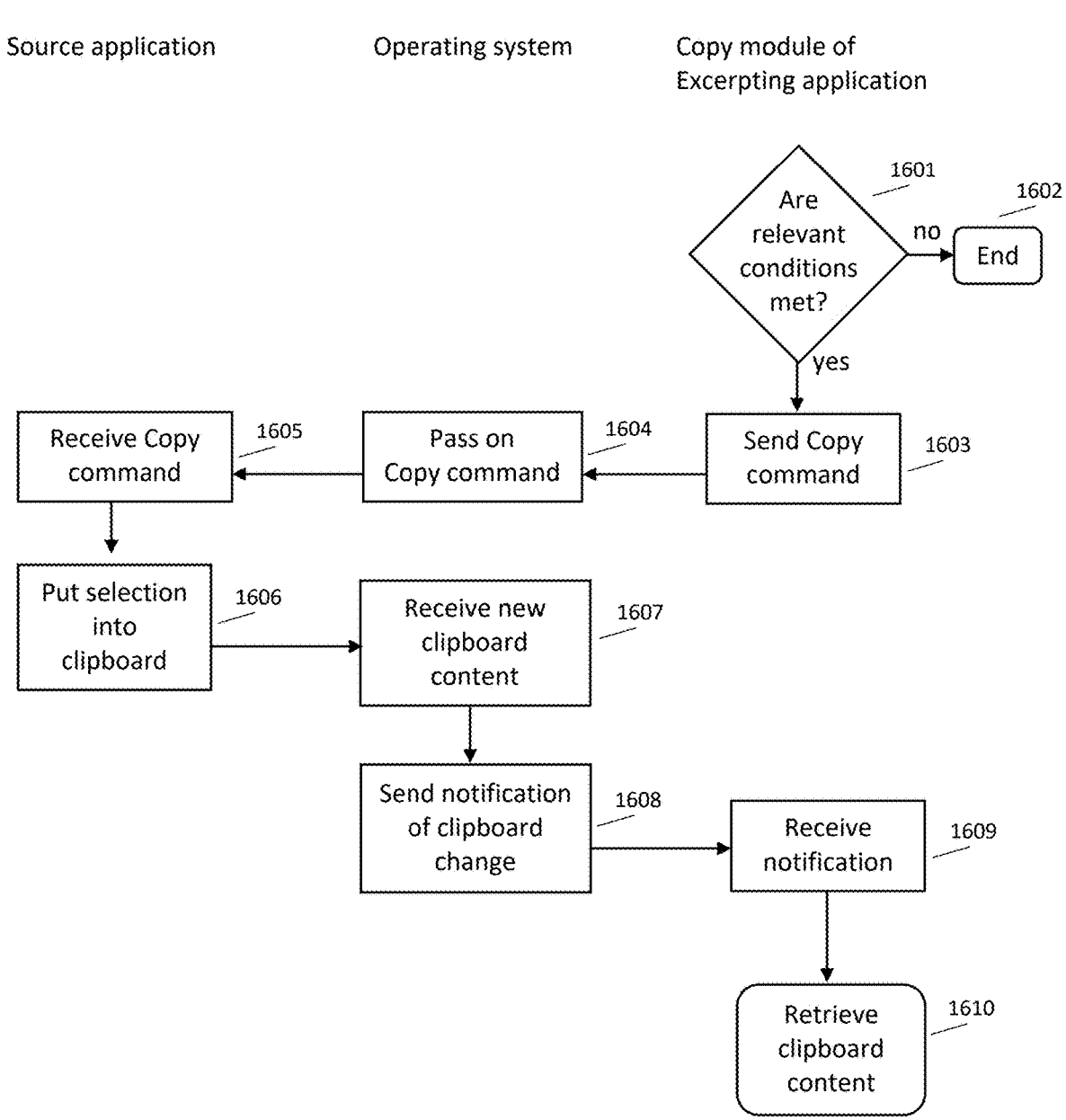
FIG. 16 is a flowchart that illustrates an optional extension of the first computer-implemented excerpting application described. The flowchart illustrates how the excerpting application can retrieve the selected portion of a document presented by a source application.

The display container of which the selection is to be retrieved by the copy module is the active display container of the source application. It needs to be active to have received the user input for making the selection. The following optional addition to the copy module is able to retrieve the selected portion of that active display container of the source application. The steps are illustrated in FIG. 16 for an embodiment. When the copy module has received the left-mouse-up event or the key-up event of the Shift key and has determined that relevant conditions are satisfied (step 1601), it sends a Copy command to the source application (steps 1603, 1604, 1605). On Windows operating systems, this can take the form of sending an equivalent of the keyboard command Control+C. On macOS operating systems, it can take the form of sending an equivalent of the keyboard command Command+C. On receiving the Copy command, the source application will execute it by placing a copy of the selected portion of its active display container-thus the selected portion of the source document-into the clipboard of the operating system (steps 1606, 1607). There it can be accessed by the excerpting application. However, the newly selected portion will not yet be in the clipboard immediately after the excerpting application sends the Copy command. The excerpting application therefore needs to monitor the clipboard for the arrival of the selected portion. In FIG. 16, this takes the form of a notification of a clipboard change sent by the operating system to the excerpting application (step 1608). This requires prior subscription by the excerpting application to such notifications, which is not shown in the figure. Not all operating systems allow such notifications of clipboard changes. An alternative way of monitoring the clipboard for the arrival of the selected portion is to query the clipboard at short intervals for information from which a change can be inferred, such as the number of changes it has undergone. When the excerpting application has the information that the selected portion has arrived in the clipboard (step 1609), the excerpting application retrieves the selected portion from the clipboard (step 1610).

Some embodiments of the first excerpting application are flexible enough to allow for copying and pasting by the CPU with HTML source documents in web browser source applications, PDF documents in PDF reader source applications, eBook source documents in eBook reader source applications, as well as text documents in text processing source applications. Individual source applications may have idiosyncrasies that do not allow for the interaction. Providing this flexibility, even if it is constrained by idiosyncrasies of individual source applications, is an optional property of the first excerpting application.

Figure 17A:
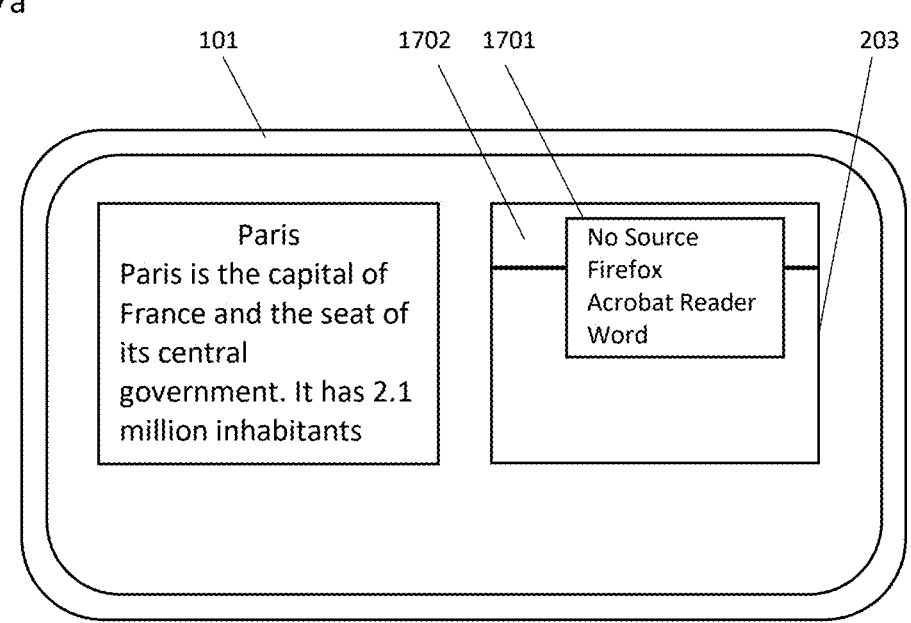
FIGS. 17a-17b illustrate a possible control of the excerpting application that allows for selecting a source application.
Figure 17B:
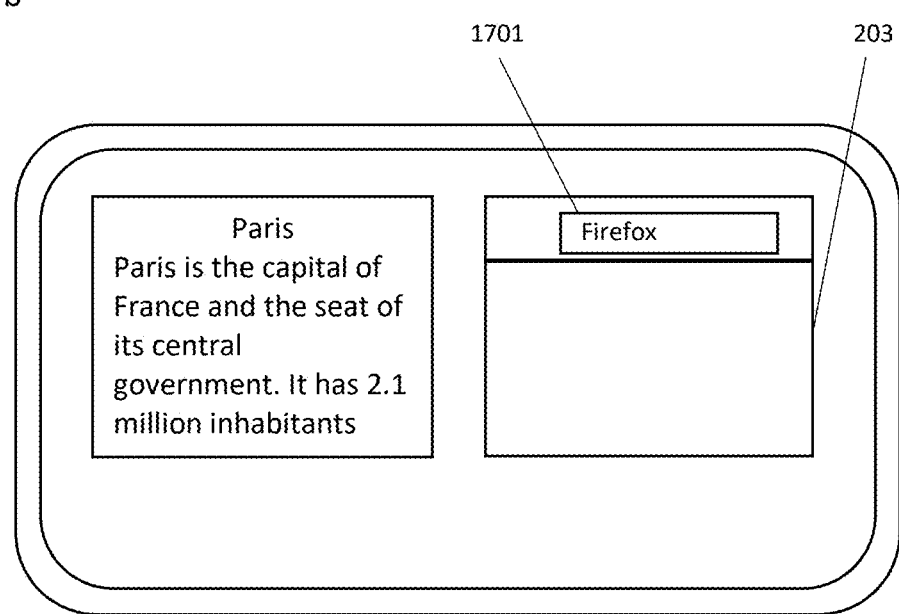

A further optional element of the first excerpting application is a selector for selecting a source application. The event of left-mouse-up or of key-up of the Shift key will then only lead to copying and pasting by the CPU if the active application—the one in which the user just triggered the event—is the selected source application. The set of applications that the user can choose from can be based on the applications that are installed on the computer or it can be based on the applications that are running in the operating system at a relevant time. The relevant time can be the time of menu opening if the options are given to the user in a menu. If the options are offered in a menu, the menu can be any kind of menu, for example a submenu of the application menu. The illustrations in FIGS. 17*a*, 17*b* employ a dropdown-menu 1701 in a toolbar 1702 that is connected to the display container 203 of the excerpt document. FIG. 17*a* shows the state at which the user has clicked on the dropdown-control and the menu is opened, showing the user's choices. In this illustration they include the option "No Source," which will stop all copying and pasting by the CPU while selected. FIG. 17*b* shows the state at which the user has selected one of the other options, here Firefox, which is then displayed in the dropdown-control 1701. With the functionality described, this has the effect that selecting portions of a document in Firefox will lead to the CPU copying them and pasting them into the display container 203, but selecting portions of documents in other applications will not lead to copying and pasting by the CPU.

The second computer-implemented excerpting application described here involves copying and pasting by the CPU from a source document to an excerpt document within the same application. For example, such an excerpting application can be a PDF-reading application with an additional option for presenting an excerpt document to create excerpts of the pdf documents displayed by the PDF-reading application.

The second computer-implemented excerpting application presents a first display container for displaying a source document and a second display container for displaying an excerpt document, and it comprises a copy module. The copy module allows the user to select a portion of the source document by moving a cursor along a selected portion of a source document while holding down a designated button; it recognizes a release of the designated button, and in response to this release, copies the selected portion of the source document and pastes the copy into the excerpt document without user input after the release of the designated button. It is thus similar to an application that implements the non-optional parts of the method described, though with both source document and excerpt document presented by the excerpting application and with the excerpting application triggering copying and pasting by the CPU. In particular, FIGS. 2*a*-2*c* also illustrate an embodiment of the second excerpting application, with the left mouse button as the designated button, with both display containers 201 and 203 belonging to the excerpting application and with the excerpting application triggering copying and pasting by the CPU in FIG. 2*c*, resulting in the pasted copy 208. Similarly, FIGS. 3*a*-3*c* also illustrate an embodiment of the second excerpting application, with the Shift key as the designated button, with both display containers 201 and 203 belonging to the excerpting application and with the excerpting application triggering copying and pasting by the CPU in FIG. 3*c*, resulting in the pasted copy 306. Likewise, FIGS. 4*a*-4*c* illustrate an embodiment of the second excerpting application, with the key labeled "F" as the designated button, with both display containers 201 and 203 belonging to the excerpting application and with the excerpting application triggering copying and pasting by the CPU in FIG. 4*c*, resulting in the pasted copy 403.

Where the source document and the excerpt document are presented by the same application, it will often be possible for the excerpting application to determine the position of the selection within the source document at the time of the release of the designated button. This facilitates using a definition of the insertion position in pasting, like the definition "Insertion by order preservation" that was described in connection with the method. An optional addition to the second excerpting application is then the following implementation of determining an insertion position for pasting by the CPU that is based on order preservation.

First, upon the release of the designated button, the position of the selected portion of the source document—its source position—is determined. This can take the form of a number that captures how many characters are present between the beginning of the source document and the beginning of the selected portion of the source document. Second, a copy of the selection is made and the information about its source position is added to it in a way that is not for display to the user. For example, the copy may be wrapped in a paragraph node that allows annotating paragraph properties, to which this information is added. Or the copy may include a marking at its beginning or end, and this marking may allow adding the information about the position of the selected portion in the source document. The information thus added about the source position of the copy is here called a position tag. Third, the copy is pasted into the excerpt document under the inclusion of the position tag. Fourth, when a new copy is made of the current selection, the new copy will be given a position tag, and all previously made copies in the excerpt document will then also have a position tag that was added to them when they were copied. The new copy is then inserted after all existing copies with position tags indicating an earlier source position than the new copy and before all existing copies with position tags indicating a later source position than the new copy.

Figure 18A:
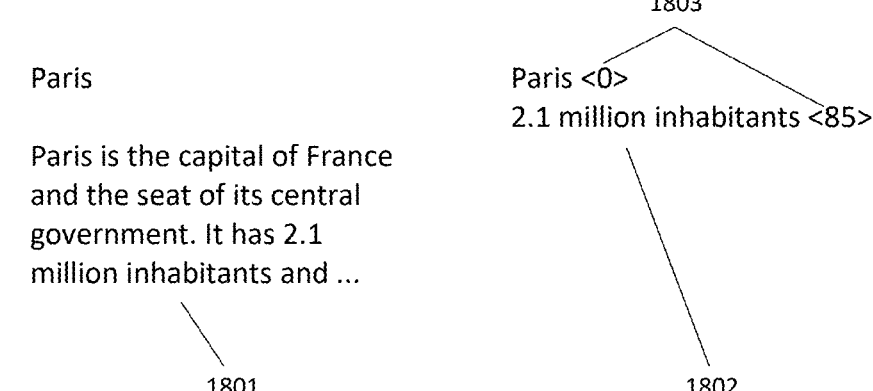
FIGS. 18a-18c illustrate an optional extension of the second computer-implemented excerpting application described. The extension uses position tags for inserting a copy in an order-preserving manner.
Figure 18B:
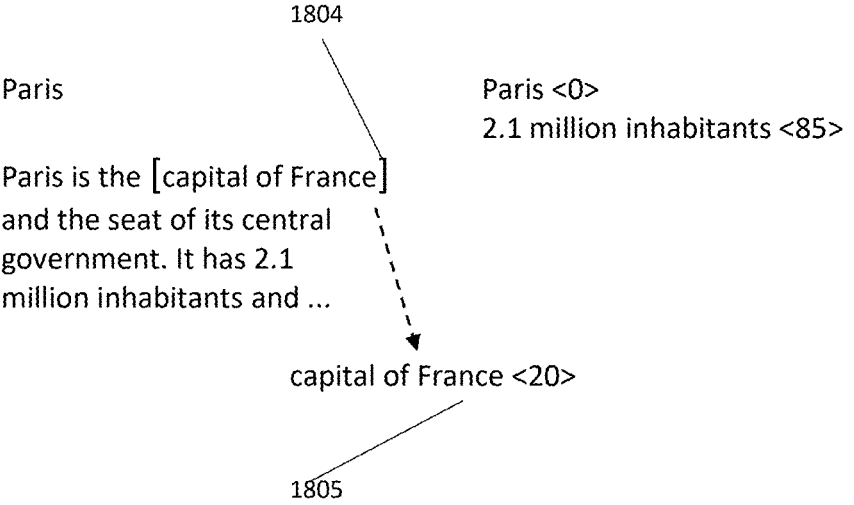
Figure 18C:
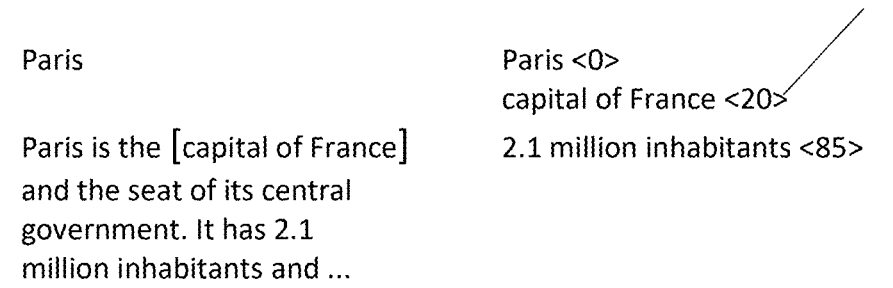

FIGS. 18*a*-18*c* illustrate three crucial steps of such a design. In FIG. 18*a*, 1801 is the source document content and 1802 is the excerpt document content. The content representation includes the position tags 1803 in angled brackets. FIG. 18*a* shows an excerpt document content after the user selecting and the CPU copying and pasting "Paris" and "2.1 million inhabitants." The headline "Paris" has 0 characters preceding it in the source document, the expression "2.1 million inhabitants" has 85 characters preceding it in the source document. FIG. 18*b* shows a following point in time at which the user has made a text selection 1804 of "capital of France." The copy made of this by the CPU is shown in 1805, which also shows a position tag added to it by the CPU, reflecting its position in the source document: There are 20 letters separating it from the beginning of the source document. In FIG. 18*c*, the copy 1805 with position tag is pasted by the CPU. It is placed after "Paris," because the number 20 is larger than the number 0, and it is placed before "2.1 million inhabitants." because the number 20 is smaller than the number 85.

What is claimed is:

1. A computer-implemented method for preparing an excerpt of a source document presented in a first display container on a display, comprising:

presenting an excerpt document in a second display container on the display;

receiving a user input to activate or deactivate an excerpt mode;

allowing a user to select a portion of the source document by moving a cursor along a selected portion of the source document while holding down a designated button;

recognizing a release of the designated button; and in response to the release of the designated button, copying the selected portion of the source document and pasting the selected portion into the excerpt document without further user input, wherein copying the selected portion of the source document and pasting the selected portion into the excerpt document is performed only while the excerpt mode is active, and wherein the designated button is a mouse button, and moving the cursor is performed by dragging a mouse, or the designated button is a keyboard button, and moving the cursor is performed by pressing arrow keys on a keyboard, or the designated button is the keyboard button, and moving the cursor is performed by dragging the mouse.

2. The computer-implemented method as in claim 1, wherein the designated button is the mouse button, and moving the cursor is performed by dragging the mouse.

3. The computer-implemented method as in claim 1, wherein the designated button is the keyboard button, and moving the cursor is performed by pressing the arrow keys on the keyboard.

4. The computer-implemented method as in claim 1, wherein the designated button is the keyboard button, and moving the cursor is performed by dragging the mouse.

5. The computer-implemented method as in claim 1, wherein pasting the selected portion into the excerpt document entails recognizing an excerpt caret position of the second display container, and either recognizing an excerpt caret position line in the excerpt document within which the excerpt caret position is located, and pasting the selected portion into a new line following the excerpt caret position line, or pasting the selected portion into a line-initial excerpt caret position.

6. The computer-implemented method as in claim 1, further comprising allowing the user to select a second portion of the source document while pressing the designated button;

recognizing a second release of the designated button; and, in response to the second release of the designated button, copying the second portion of the source document and pasting the second portion into the excerpt document without further user input, wherein copying the selected portion of the source document and pasting the selected portion into the excerpt document includes identifying a first source position of the selected portion within the source document, and pasting the selected portion into the excerpt document at a first excerpt position, and wherein copying the second portion of the source document and pasting the second portion into the excerpt document includes identifying a second source position of the second portion within the source document, and pasting the second portion into the excerpt document in a position that follows the first excerpt position, if the second source position follows the first source position, or pasting the second portion into the excerpt document in a position that precedes the first excerpt position, if the second source position precedes the first source position.

7. The computer-implemented method as in claim 1, further comprising:

receiving a user input to activate or deactivate an excerpt mode, wherein copying the selected portion of the source document and pasting the selected portion into the excerpt document is performed only while the excerpt mode is active.

8. The computer-implemented method as in claim 1, wherein copying and pasting the selected portion includes one or more user-selectable options from the group consisting of removing boldfacing from text contained in the selected portion, removing italicizing from text contained in the selected portion, removing underlining from text contained in the selected portion, removing coloring from text contained in the selected portion, disabling clickable links in the selected portion, capitalizing a first word of text in the selected portion, and adjusting a grammar of text in the selected portion.

9. The computer-implemented method as in claim 1, further comprising allowing a user to select a hierarchy level, wherein copying and pasting the selected portion includes formatting the selected portion based on the hierarchy level, and pasting the selected portion into the excerpt document with its hierarchy level accessible in the excerpt document.

10. The computer-implemented method as in claim 9, wherein formatting the selected portion based on the hierarchy level includes one or more of adding a bullet before the selected portion, adding a number before the selected portion, adding a letter before the selected portion, setting a font size of the selected portion, setting a font weight of the selected portion, setting a font style of the selected portion, adding underlining to the selected portion, or setting a text color of the selected portion.

11. The computer-implemented method as in claim 10, further comprising allowing the user to select the hierarchy level among a set of level buttons that are each visibly associated with one hierarchy level, and wherein highlighting of one level button shows a currently active level, and wherein each level button is visibly paired with a property button that opens a menu in which the user can select formatting properties for formatting based on the hierarchy level.

12. The computer-implemented method as in claim 1, wherein the first display container with the source document is presented on the display of a first computer, and wherein the second display container with the excerpt document is presented on the display of a mobile device that is connected to the first computer by a cable or a local wireless connection, wherein copying the selected portion of the source document is followed by the first computer sending the selected portion to the mobile device, and wherein pasting the selected portion into the excerpt document takes place on the mobile device.

13. A computer-implemented excerpting application, running on a multitasking operating system and comprising:

an excerpt display container for displaying an excerpt document;

a global event listener for mouse events or keyboard events; and a copy module configured to respond to a left-mouse-up event or a key-up event of a Shift key in a source application, by copying a selected portion of a source document in a source display container of the source application, and pasting the selected portion into the excerpt document, wherein the copy module comprises an excerpt mode that can be activated and deactivated by a user, and wherein copying the selected portion and pasting the selected portion are performed only when the excerpt mode is activated.

14. The computer-implemented excerpting application as in claim 13, wherein the copy module copies the selected portion from the source application by sending a Copy command to the source application, monitoring a clipboard of the multitasking operating system for an arrival of the selected portion, and retrieving the selected portion from the clipboard.

15. The computer-implemented excerpting application as in claim 13, wherein the source document is an HTML document and the source application is a web browser, or the source document is a PDF document and the source application is a PDF reader, or the source document is an eBook and the source application is an eBook reader, or the source document is a text document and the source application is a text processing application.

16. The computer-implemented excerpting application as in claim 13, further comprising:

a selector for selecting the source application, wherein copying the selected portion of the source document and pasting the selected portion into the excerpt document is performed only if the source application is active.

17. A computer-implemented excerpting application, comprising:

a first display container for displaying a source document;

a second display container for displaying an excerpt document; and a copy module configured for allowing a user to select a portion of the source document by moving a cursor along a selected portion of the source document while holding down a designated button, recognizing a release of the designated button, and in response to the release of the designated button, copying the selected portion of the source document and pasting the selected portion into the excerpt document without further user input, wherein the copy module comprises an excerpt mode that can be activated and deactivated by a user, and wherein copying the selected portion and pasting the selected portion are performed only when the excerpt mode is activated.

18. The computer-implemented excerpting application as in claim 17, wherein copying the selected portion entails determining a source position of the selected portion in the source document, and encoding the source position in the selected portion as a position tag, and wherein pasting the selected portion into the excerpt document comprises placing the selected portion after all copies with position tags corresponding to an earlier position in the source document than the selected portion, and placing the selected portion before all copies with position tags corresponding to a later position in the source position than the selected portion.

\* \* \* \* \*